(12) United States Patent
Hosseini et al.

(10) Patent No.: US 11,910,365 B2
(45) Date of Patent: Feb. 20, 2024

(54) SLOT FORMAT FOR LOW LATENCY SIDELINK COMMUNICATIONS

(71) Applicant: QUALCOMM Incorporated, San Diego, CA (US)

(72) Inventors: Seyedkianoush Hosseini, San Diego, CA (US); Wei Yang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 17/206,403

(22) Filed: Mar. 19, 2021

(65) Prior Publication Data

US 2022/0303982 A1 Sep. 22, 2022

(51) Int. Cl.
*H04W 72/0446* (2023.01)
*H04W 72/20* (2023.01)

(52) U.S. Cl.
CPC ....... *H04W 72/0446* (2013.01); *H04W 72/20* (2023.01)

(58) Field of Classification Search
CPC ......... H04W 72/0446; H04W 72/0406; H04W 72/20
See application file for complete search history.

(56) References Cited

U.S. PATENT DOCUMENTS

| 2017/0230938 A1 | 8/2017 | Huang et al. | |
| 2017/0280472 A1* | 9/2017 | Gupta | H04W 72/1215 |
| 2021/0051525 A1 | 2/2021 | Cao et al. | |
| 2021/0144750 A1* | 5/2021 | Cao | H04W 72/0446 |
| 2021/0212032 A1* | 7/2021 | Lee | H04W 72/23 |
| 2021/0250910 A1* | 8/2021 | Park | H04W 72/005 |
| 2021/0314749 A1* | 10/2021 | Kwak | H04L 5/0044 |
| 2021/0360624 A1* | 11/2021 | Zhang | H04L 5/0044 |
| 2021/0385804 A1* | 12/2021 | Ye | H04W 72/0406 |

(Continued)

FOREIGN PATENT DOCUMENTS

| EP | 3634061 A1 | 4/2020 |
| EP | 3780891 A1 | 2/2021 |

(Continued)

OTHER PUBLICATIONS

International Search Report and Written Opinion—PCT/US2022/016998—ISA/EPO—dated May 20, 2022.

*Primary Examiner* — Jasper Kwoh
(74) *Attorney, Agent, or Firm* — QUALCOMM Incorporated

(57) ABSTRACT

Methods, systems, and devices for wireless communications are described related to a slot format for low latency sidelink communications. A group of user equipments (UEs) may receive an indication of a configuration of a sidelink resource pool. The sidelink resource pool may include one or more slots and one or more subchannels, and a slot of the sidelink resource pool may include a control region allocated for a sidelink control channel and a set of contiguous subslots each allocated for a sidelink data channel. A first UE may transmit sidelink control information (SCI) to a second UE in the control region of a slot to reserve one or more subslot of the same slot or any quantity of different slots for a sidelink message. The first UE may transmit the sidelink message to the second UE in the subslot.

30 Claims, 17 Drawing Sheets

(56) References Cited

U.S. PATENT DOCUMENTS

| | | | |
|---|---|---|---|
| 2022/0116894 A1* | 4/2022 | Yokomakura | H04L 5/0051 |
| 2022/0116916 A1* | 4/2022 | Zhao | H04W 72/1289 |
| 2022/0217678 A1* | 7/2022 | Yoshioka | H04L 5/0053 |
| 2022/0232532 A1* | 7/2022 | Wu | H04W 72/02 |
| 2022/0256535 A1* | 8/2022 | Horiuchi | H04L 5/0044 |

FOREIGN PATENT DOCUMENTS

| | | |
|---|---|---|
| WO | WO-2016045442 A1 | 3/2016 |
| WO | WO-2017195495 A1 | 11/2017 |
| WO | WO-2020105191 A1 | 5/2020 |

* cited by examiner

SLOT FORMAT FOR LOW LATENCY SIDELINK COMMUNICATIONS

FIELD OF TECHNOLOGY

The following relates to wireless communications, including slot format for low latency sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support slot format for low latency sidelink communications. Generally, the described techniques provide for a resource configuration for a sidelink resource pool in which a format of each slot of the sidelink resource pool includes a control region and a set of contiguous subslots to support sidelink communications with reduced latency. For example, a sidelink resource pool that may be configured for a group of user equipments (UEs) may include one or more slots in a time domain and one or more subchannels in a frequency domain. Each slot within each subchannel of the resource pool may include a respective control region allocated for a sidelink control channel and a respective set of contiguous subslots each allocated for a sidelink data channel. The sidelink resource pool may be configured for a sidelink resource allocation mode 1, in which a base station may schedule sidelink communications for the group of UEs, or a sidelink resource allocation mode 2, in which the UEs may autonomously (e.g., without signaling from the base station) schedule resources for sidelink communications.

Transmission of a sidelink message may be scheduled within one or more subslots of one or more slots within the sidelink resource pool. For example, if the resource pool is configured for sidelink resource allocation mode 1, the base station may identify available resources within one or more subslots of one or more slots and may transmit an indication to a transmitting UE of the group of UEs that the one or more subslots are reserved for a sidelink transmission by the transmitting UE. If the sidelink resource pool is configured for sidelink resource allocation mode 2, the transmitting UE may autonomously identify resources within one or more subslots of one or more slots as available for a sidelink transmission by the transmitting UE. Regardless of the resource allocation mode, the transmitting UE may transmit sidelink control information (SCI) within the control region of a slot to reserve one or more subslots within the set of contiguous subslots of the slot, or one or more other subslots of one or more subsequent slots, or both. The transmitting UE may transmit a sidelink message within the one or more subslots reserved by the SCI. In some examples (e.g., according to a resource reservation mode 1), a UE or a base station may schedule transmission of a single transport block (e.g., a sidelink message or a retransmission of a sidelink message) per sub slot. Additionally or alternatively (e.g., according to a resource reservation mode 2), the UE or the base station may schedule transmission of a single transport block within a group of contiguous subslots (e.g., within a single slot). The resource reservation mode may be indicated to the group of UEs via the configuration information for the sidelink resource pool, via downlink control information (DCI), via SCI, or any combination thereof.

A method for wireless communications by a first UE is described. The method may include receiving an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, transmitting, to a second UE of the group of UEs in the control region of the slot, SCI that reserves a subslot of the slot for a sidelink message to the second UE, and transmitting at least a portion of the sidelink message to the second UE in the subslot.

An apparatus for wireless communications by a first UE is described. The apparatus may include a processor, memory coupled with the processor, and instructions stored in the memory. The instructions may be executable by the processor to cause the apparatus to receive an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, transmit, to a second UE of the group of UEs in the control region of the slot, SCI that reserves a subslot of the slot for a sidelink message to the second UE, and transmit at least a portion of the sidelink message to the second UE in the subslot.

Another apparatus for wireless communications by a first UE is described. The apparatus may include means for receiving an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, means for transmitting, to a second UE of the group of UEs in the control region of the slot, SCI that reserves a subslot of the slot for a sidelink message to the second UE, and means for transmitting at least a portion of the sidelink message to the second UE in the subslot.

A non-transitory computer-readable medium storing code for wireless communications by a first UE is described. The code may include instructions executable by a processor to receive an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, transmit, to a second UE of the group of UEs in the control region of the slot, SCI that reserves a subslot of the slot for a sidelink message to the second UE, and transmit at least a portion of the sidelink message to the second UE in the subslot.

Some examples of the method, apparatuses, and non-transitory computer-readable medium described herein may further include operations, features, means, or instructions for reserving, via the SCI, a second subslot for a retransmission of the sidelink message, where the second subslot may be within the slot or within a second set of contiguous subslots included in a second slot of the sidelink resource pool and transmitting the retransmission of the sidelink message to the second UE in the second subslot.

Some examples of the method, apparatuses, and non-transitory computer-readable medium described herein may further include operations, features, means, or instructions for receiving, from the second UE in a third subslot subsequent to the subslot and prior to the second subslot, a sidelink feedback message corresponding to the sidelink message, where transmitting the retransmission of the sidelink message in the second subslot may be based on receiving the sidelink feedback message.

In some examples of the method, apparatuses, and non-transitory computer-readable medium described herein, the SCI reserves a group of subslots within the set of contiguous subslots, the group of subslots including the subslot and one or more other subslots, and the sidelink message includes a transport block that spans the group of subslots.

In some examples of the method, apparatuses, and non-transitory computer-readable medium described herein, the one or more other subslots may be contiguous with the subslot.

In some examples of the method, apparatuses, and non-transitory computer-readable medium described herein, wherein whether the one or more other subslots are contiguous with the subslot may be based at least in part on whether the first UE is capable of mapping the transport block to noncontiguous subslots.

Some examples of the method, apparatuses, and non-transitory computer-readable medium described herein may further include operations, features, means, or instructions for identifying a resource reservation mode for the SCI, the identified resource reservation mode one of a set of resource reservation modes including: a first resource reservation mode that corresponds to reserving, from the set of contiguous sub slots, a single subslot per transport block and a second resource reservation mode that corresponds to reserving, from the set of contiguous subslots, a group of subslots per transport block. The method, apparatuses, and non-transitory computer-readable medium described herein may further include operations, features, means, or instructions for configuring the SCI to reserve one or more subslots of the slot for the sidelink message in accordance with the identified resource reservation mode, the one or more subslots including the subslot.

In some examples of the method, apparatuses, and non-transitory computer-readable medium described herein, the indication of the configuration of the sidelink resource pool indicates a configured resource reservation mode for the sidelink resource pool and identifying the resource reservation mode includes identifying the configured resource reservation mode.

Some examples of the method, apparatuses, and non-transitory computer-readable medium described herein may further include operations, features, means, or instructions for receiving, from a base station via DCI, an indication of the resource reservation mode, where identifying the resource reservation mode includes identifying the indicated resource reservation mode.

Some examples of the method, apparatuses, and non-transitory computer-readable medium described herein may further include operations, features, means, or instructions for selecting, by the first UE, the resource reservation mode from the set of resource reservation modes, where identifying the resource reservation mode includes selecting the resource reservation mode and transmitting, to the second UE within the SCI, an indication of the identified resource reservation mode.

In some examples of the method, apparatuses, and non-transitory computer-readable medium described herein, a first symbol within the slot includes an automatic gain control (AGC) symbol, a last symbol within the slot includes a gap symbol, and remaining symbols within the slot may be each allocated for the sidelink control channel or the sidelink data channel.

In some examples of the method, apparatuses, and non-transitory computer-readable medium described herein, the sidelink data channel spans at least one subchannel within each symbol included in the set of contiguous subslots.

In some examples of the method, apparatuses, and non-transitory computer-readable medium described herein, a second subslot may be between the control region and the subslot.

Some examples of the method, apparatuses, and non-transitory computer-readable medium described herein may further include operations, features, means, or instructions for reserving, via the SCI, a second subslot within a second slot subsequent to the slot for a second sidelink message to the second UE and transmitting the second sidelink message to the second UE at least partially in the second subslot.

In some examples of the method, apparatuses, and non-transitory computer-readable medium described herein, each slot within each subchannel of the sidelink resource pool includes a respective control region allocated for the sidelink control channel and a respective set of contiguous subslots allocated for the sidelink data channel.

A method for wireless communications at a second UE is described. The method may include receiving an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, receiving, from the first UE in the control region of the slot, SCI that reserves a subslot of the set of contiguous subslots for a sidelink message to the second UE, and receiving the sidelink message from the first UE at least partially in the subslot.

An apparatus for wireless communications at a second UE is described. The apparatus may include a processor, memory coupled with the processor, and instructions stored in the memory. The instructions may be executable by the processor to cause the apparatus to receive an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, receive, from the first UE in the control region of the slot, SCI that reserves a subslot of the set of contiguous subslots for a sidelink message to the second UE, and receive the sidelink message from the first UE at least partially in the subslot.

Another apparatus for wireless communications at a second UE is described. The apparatus may include means for receiving an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, means for receiving, from the first UE in the control region of the slot, SCI that reserves a subslot of the set of contiguous subslots for a sidelink message to the second UE, and means for receiving the sidelink message from the first UE at least partially in the subslot.

A non-transitory computer-readable medium storing code for wireless communications at a second UE is described. The code may include instructions executable by a processor to receive an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, receive, from the first UE in the control region of the slot, SCI that reserves a subslot of the set of contiguous subslots for a sidelink message to the second UE, and receive the sidelink message from the first UE at least partially in the subslot.

Some examples of the method, apparatuses, and non-transitory computer-readable medium described herein may further include operations, features, means, or instructions for receiving a retransmission of the sidelink message from the first UE in a second subslot, the second subslot within the slot or within a second set of contiguous subslots included in a second slot of the sidelink resource pool, where the SCI further reserves the second subslot for the retransmission of the sidelink message.

Some examples of the method, apparatuses, and non-transitory computer-readable medium described herein may further include operations, features, means, or instructions for transmitting, to the first UE in a third subslot subsequent to the subslot and prior to the second subslot, a sidelink feedback message corresponding to the sidelink message, where receiving the retransmission of the sidelink message in the second subslot based on transmitting the sidelink feedback message.

In some examples of the method, apparatuses, and non-transitory computer-readable medium described herein, the SCI reserves a group of subslots within the set of contiguous subslots, the group of subslots including the subslot and one or more other subslots, and the sidelink message includes a transport block that spans the group of subslots.

Some examples of the method, apparatuses, and non-transitory computer-readable medium described herein may further include operations, features, means, or instructions for identifying a resource reservation mode for the SCI, the resource reservation mode one of a set of resource reservation modes including: a first resource reservation mode that corresponds to reserving, from the set of contiguous subslots, a single subslot per transport block and a second resource reservation mode that corresponds to reserving, from the set of contiguous subslots, a group of subslots per transport block. Some examples of the method, apparatuses, and non-transitory computer-readable medium described herein may further include operations, features, means, or instructions for decoding the sidelink message based on the resource reservation mode.

In some examples of the method, apparatuses, and non-transitory computer-readable medium described herein, the indication of the configuration of the sidelink resource pool indicates a configured resource reservation mode for the sidelink resource pool and identifying the resource reservation mode includes identifying the configured resource reservation mode.

Some examples of the method, apparatuses, and non-transitory computer-readable medium described herein may further include operations, features, means, or instructions for receiving, from a base station via DCI, an indication of the resource reservation mode, where identifying the resource reservation mode includes identifying the indicated resource reservation mode.

Some examples of the method, apparatuses, and non-transitory computer-readable medium described herein may further include operations, features, means, or instructions for receiving, within the SCI, an indication of the resource reservation mode, where the identified resource reservation mode includes the indicated resource reservation mode.

Some examples of the method, apparatuses, and non-transitory computer-readable medium described herein may further include operations, features, means, or instructions for receiving a second sidelink message from the first UE at least partially in a second subslot within a second slot subsequent to the slot, where the SCI reserves the second subslot for the second sidelink message.

A method for wireless communications at a base station is described. The method may include transmitting, to a group of UEs, an indication of a configuration of a sidelink resource pool for the group of UEs, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, identifying one or more subslots of the set of contiguous subslots that are available for sidelink communications, and transmitting, to a UE of the group of UEs, an indication that the one or more subslots are reserved for the sidelink communications.

An apparatus for wireless communications at a base station is described. The apparatus may include a processor, memory coupled with the processor, and instructions stored in the memory. The instructions may be executable by the processor to cause the apparatus to transmit, to a group of UEs, an indication of a configuration of a sidelink resource pool for the group of UEs, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, identify one or more subslots of the set of contiguous subslots that are available for sidelink communications, and transmit, to a UE of the group of UEs, an indication that the one or more subslots are reserved for the sidelink communications.

Another apparatus for wireless communications at a base station is described. The apparatus may include means for transmitting, to a group of UEs, an indication of a configuration of a sidelink resource pool for the group of UEs, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, means for identifying one or more subslots of the set of contiguous subslots that are available for sidelink communications, and means for transmitting, to a UE of the group of UEs, an indication that the one or more subslots are reserved for the sidelink communications.

A non-transitory computer-readable medium storing code for wireless communications at a base station is described. The code may include instructions executable by a processor to transmit, to a group of UEs, an indication of a configuration of a sidelink resource pool for the group of UEs, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel, identify one or more subslots of the set of contiguous subslots that are available for sidelink communications, and transmit, to a UE of the group of UEs, an indication that the one or more subslots are reserved for the sidelink communications.

In some examples of the method, apparatuses, and non-transitory computer-readable medium described herein, transmitting the indication that the one or more subslots may be reserved for the sidelink communications may include operations, features, means, or instructions for transmitting DCI to the UE, where the DCI reserves the one or more subslots for transmission of a sidelink message from the UE to a second UE of the group of UEs.

In some examples of the method, apparatuses, and non-transitory computer-readable medium described herein, the indication that the one or more subslots may be reserved for the sidelink communications allocates sidelink resources within the sidelink resource pool to the UE for sidelink transmissions by the UE, the allocated sidelink resources including the one or more subslots and at least one subslot within a second slot of the sidelink resource pool.

Some examples of the method, apparatuses, and non-transitory computer-readable medium described herein may further include operations, features, means, or instructions for selecting a resource reservation mode for a sidelink communication by the UE, the selected resource reservation mode one of a set of resource reservation modes including: a first resource reservation mode that corresponds to reserving, from the set of contiguous subslots, a single subslot per transport block and a second resource reservation mode that corresponds to reserving, from the set of contiguous subslots, a group of subslots per transport block. Some examples of the method, apparatuses, and non-transitory computer-readable medium described herein may further include operations, features, means, or instructions for indicating the selected resource reservation mode to the UE via the indication of the configuration of the sidelink resource pool or via DCI.

DETAILED DESCRIPTION

Figure 1:
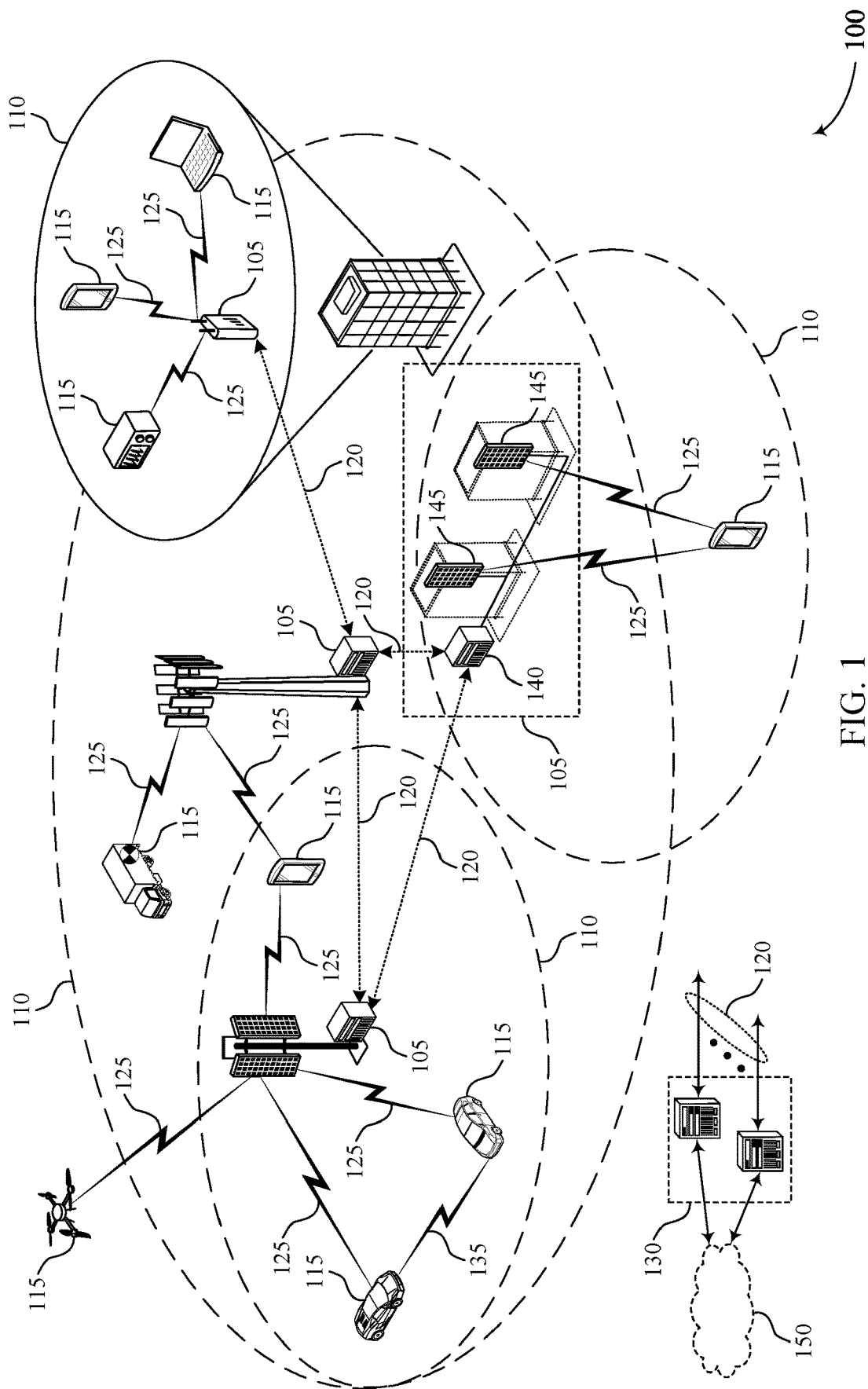
FIG. 1 illustrates an example of a wireless communications system that supports slot format for low latency sidelink communications in accordance with aspects of the present disclosure.

In some wireless communications systems, sidelink communications (where a sidelink communication may refer to a message sent by a user equipment (UE) and received by one or more other UEs) may be scheduled according to a slot granularity (e.g., one transport block may be transmitted or received per slot). In such cases, a round-trip time (RTT) that includes, for example, transmission of a sidelink message in a first slot, reception of sidelink feedback in a second slot, and retransmission of the sidelink message in a third slot may not be sufficiently low-latency for some applications. In some cases, a slot may include one or more mini-slots that each include time and frequency resources allocated for a sidelink control channel and a sidelink data channel, with gap symbols present between the mini-slots of a slot. Communications within the sidelink data channel of a mini-slot may be scheduled via the sidelink control channel for the same mini-slot. However, slots formatted to include mini-slots may not support relatively large packet (e.g., transmission block) sizes, and gap symbols and automatic gain control (AGC) symbols located between each mini-slot may reduce spectral efficiency and result in increased scheduling overhead, which negate or offset any associated latency benefits.

As described herein, a sidelink resource pool may include any quantity of slots. In some cases, each slot may span a subchannel in the frequency domain, and the slots of a sidelink resource pool may collectively span any quantity of subchannels. To reduce latency associated with sidelink communications, each slot of a sidelink resource pool may include a control region allocated for a control channel (e.g., a physical sidelink control channel (PSCCH)) and a set of contiguous subslots each allocated for a sidelink data channel (e.g., a physical sidelink shared channel (PSSCH)). The control region and the set of subslots within the slot may occupy contiguous symbols within the slot (e.g., the subslots within each slot may be contiguous in the time domain, and may not include gap symbols between each subslot—rather, one or more gap symbols may be included at the end of a slot). Sidelink control information (SCI) transmitted within the control region of one slot may schedule communications within one or more subslots of the same slot, one or more subslots of any other slot of the sidelink resource pool, or both. In some cases, a pattern of subslots within one or more slots may be configured (e.g., semi-statically configured) via control signaling from a base station (e.g., radio resource control (RRC) signaling. Additionally or alternatively, a pattern of subslots within one or more slots may be flexible, and a UE that reserves one or more subslots via SCI may indicate (e.g., via the SCI) a quantity of symbols that are reserved, with the reserved symbols representing a subslot. In some cases, the first symbol of each slot may include an AGC symbol. A receiving UE may determine an AGC setting for receiving sidelink data in each of the remaining symbols of the slot based on the first AGC symbol. Through these and other aspects of the techniques described herein, latency may be reduced as compared with conventional mini-slot-based scheduling for sidelink communications, larger transmission blocks may be supported, and spectral efficiency may be improved (e.g., due to the reduction in quantity of gap and AGC symbols) relative to the use of mini-slots or other alternative techniques.

In some examples, a set of UEs may operate according to a sidelink resource allocation mode 1, in which a base station may transmit downlink control information (DCI) to a transmitting UE to schedule resources (e.g., reserve one or more subslots) for a sidelink transmission by the UE, configure the UE with sidelink resources for one or more sidelink transmissions, or both. Additionally or alternatively, a set of UEs may operate according to a sidelink resource allocation mode 2, in which a transmitting UE may perform channel sensing to autonomously identify available resources and schedule one or more transmissions within the available resources (e.g., within one or more sub slots). The transmitting UE may transmit SCI within the control region of a slot to reserve one or more subslots within the set of contiguous subslots of the slot, or one or more other subslots of one or more subsequent slots, or both (e.g., under either resource allocation mode 1 or resource allocation mode 2, or in accordance with some other mode).

A SCI message may reserve a quantity of non-contiguous subslots (e.g., in the same or different slots) for transmission and one or more retransmissions of a sidelink message (e.g., according to a resource reservation mode 1), a group of contiguous subslots for transmission or retransmission of a sidelink message (e.g., according to a resource reservation mode 2), or both. A group of UEs may be configured with a sidelink resource pool for sidelink communications, and configuration information for the sidelink resource pool may indicate a configured sidelink resource allocation mode, resource reservation mode, or both. Additionally or alternatively the resource reservation mode may be indicated to a receiving UE via DCI, SCI, or both.

Aspects of the disclosure are initially described in the context of wireless communications systems. Additional aspects are described with reference to sidelink resource configurations and process flows. Aspects of the disclosure are further illustrated by and described with reference to apparatus diagrams, system diagrams, and flowcharts that relate to slot format for low latency sidelink communications.

FIG. 1 illustrates an example of a wireless communications system 100 that supports slot format for low latency sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols, or alternatively a control region containing one or more symbols and a set of contiguous subslots each containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, a subslot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. In some examples, a control region for a PSCCH may be defined by a number of symbol periods in (e.g., near a beginning of) each slot in a sidelink resource pool and may extend across the system bandwidth or a subset of the system bandwidth (e.g., one or more subchannels within the sidelink resource pool). For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein. In one example, some UEs 115, such as MTC or IoT devices, may communicate with one another using resources within a sidelink resource pool. The UEs 115 may transmit or receive sidelink communications via one or more slots of the sidelink resource pool that may each include a control region and a set of contiguous subslots. By utilizing sidelink subslots, the UEs 115 and the wireless communications system 100 may support ultra-reliable communications, or low-latency communications, or various combinations thereof, via a sidelink communication link 135.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive configuration information for a sidelink resource pool for a group of UEs 115 that includes the UE 115. The sidelink resource pool may include one or more slots in a time domain and one or more subchannels in a frequency domain, with each slot in the time domain occupying one subchannel in the frequency domain. Each slot within each subchannel of the resource pool may include a control region allocated for a sidelink control channel (e.g., a PSCCH) and a set of contiguous subslots each allocated for a sidelink data channel (e.g., PSSCH). The sidelink resource pool may be configured for a sidelink resource allocation mode 1, in which a base station 105 may schedule sidelink communications for the group of UEs 115, or a sidelink resource allocation mode 2, in which the UEs 115 autonomously (e.g., without signaling from the base station 105) schedule resources for sidelink communications.

If the resource pool is configured for sidelink resource allocation mode 1, the base station 105 may identify available resources within one or more subslots of the set of contiguous subslots within each slot of the resource pool and transmit an indication to one or more transmitting UEs 115 of the group of UEs 115 that the one or more subslots are reserved for a sidelink transmission by the transmitting UE(s) 115. If the sidelink resource pool is configured for sidelink resource allocation mode 2, a transmitting UE 115 may autonomously identify and reserve available resources within one or more of the subslots. Regardless of the resource allocation mode, a transmitting UE 115 may transmit SCI within the control region of a slot to indicate a reservation of one or more subslots within the set of contiguous subslots of the slot, or one or more other subslots of one or more subsequent slots. The UE 115 may transmit a sidelink message within the one or more subslots that were reserved by the SCI. In some examples (e.g., according to a resource reservation mode 1), a UE 115 or a base station 105 may schedule transmission of a single transport block (e.g., a sidelink message or a retransmission of a sidelink message) per subslot. Additionally or alternatively (e.g., according to a resource reservation mode 2), the UE 115 or the base station 105 may schedule transmission of a single transport block within a group of contiguous subslots. The resource reservation mode may be indicated to the group of UEs 115 via the configuration information for the sidelink resource pool, via DCI, via SCI, or any combination thereof.

Figure 2:
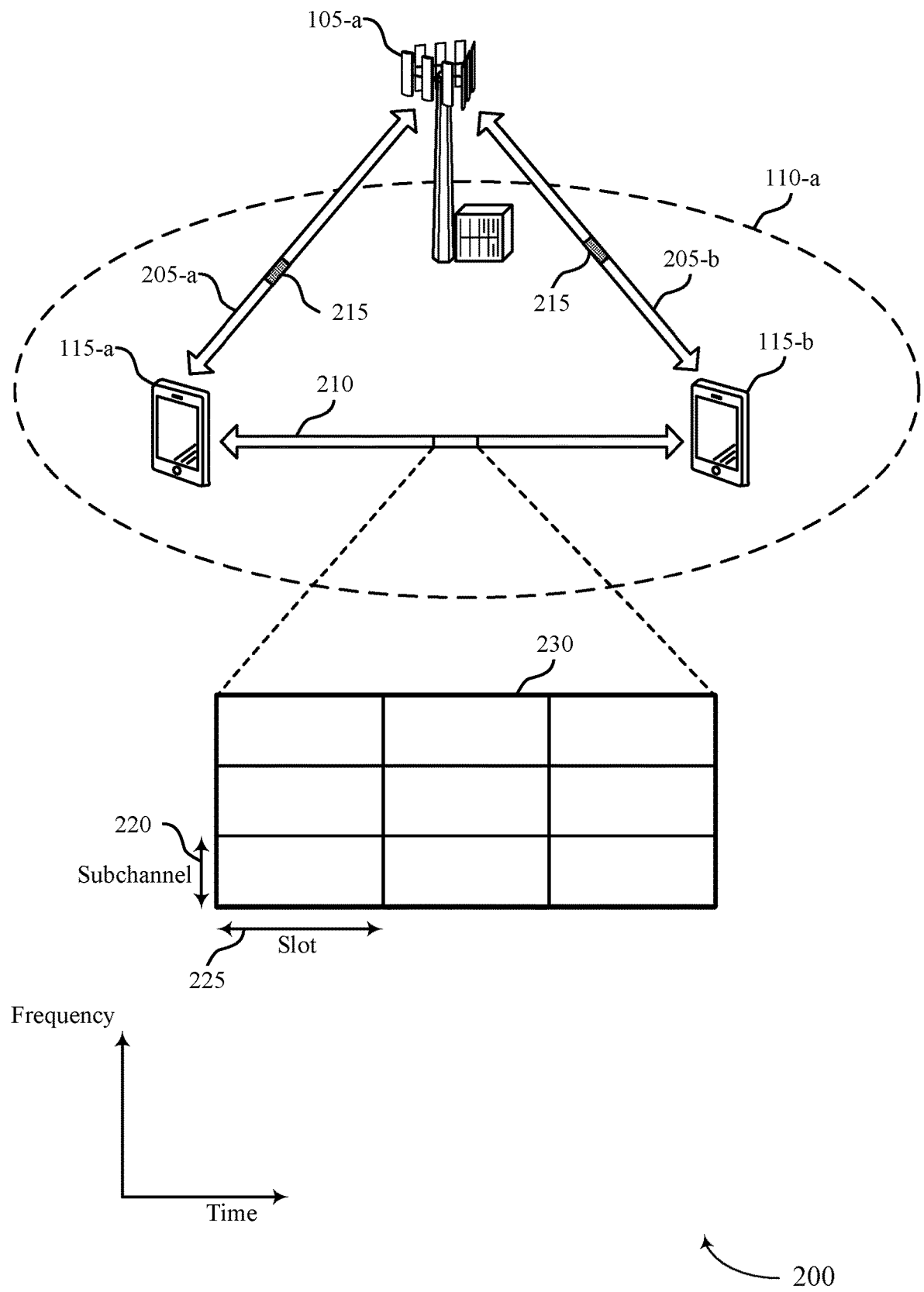
FIG. 2 illustrates an example of a wireless communications system that supports slot format for low latency sidelink communications in accordance with aspects of the present disclosure.

FIG. 2 illustrates an example of a wireless communications system 200 that supports slot format for low latency sidelink communications in accordance with aspects of the present disclosure. In some examples, the wireless communications system 200 may implement some aspects of the wireless communications system 100. For example, the wireless communications system 200 may include a base station 105-a and UEs 115-a and 115-b (e.g., among other UEs 115), which may represent examples of a base station 105 and UEs 115 as described with reference to FIG. 1. Base station 105-a and UEs 115-a and 115-b may communicate within a geographic coverage area 110-a and via communication links 205-a and 205-b (e.g., Uu links), respectively. UEs 115-a and 115-b may communicate with each other or with one or more other UEs 115 in geographic coverage area 110-a via a sidelink communication link 210 (e.g., a PC5 link). In some examples, base station 105-a may transmit configuration information 215 to a group of UEs 115 including UEs 115-a and 115-b to configure a sidelink resource pool 230 for sidelink communications by the group of UEs 115 (e.g., a cell-specific sidelink resource pool 230).

The group of UEs 115 (e.g., UEs 115 within a geographic coverage area 110 or a cell) may be configured with one or more sidelink resource pools 230 that each include time and frequency resources allocated for sidelink communications (e.g., transmission of PSSCH or reception of PSSCH) by the group of UEs 115. Each sidelink resource pool 230 may include a quantity of subchannels 220 in the frequency domain and a quantity of slots 225 in the time domain. Each slot 225 may include one or more symbols (e.g., OFDM symbols) in the time domain. Each subchannel 220 may include a quantity of contiguous PRBs. In some examples, the quantity of subchannels within a sidelink resource pool 230 (e.g., sl-Num-Subchannel), the quantity of PRBs per subchannel (e.g., sl-SubchannelSize), or both, may be configured via higher layer parameters.

In the example of the wireless communications system 200, base station 105-*a* may transmit the configuration information 215 (e.g., via higher layers) to UEs 115-*a*, 115-*b*, and one or more other UEs 115 of the group of UEs 115 to indicate a configured set of sidelink resource pools 230 that are allocated for sidelink communications. Although the sidelink resource pool 230 illustrated in FIG. 2 includes three slots 225 in the time domain and three subchannels 220 in the frequency domain, it is to be understood that a sidelink resource pool 230 may include any quantity of slots 225 and any quantity of subchannels 220. The slots 225, the subchannels 220, or both, may or may not be contiguous in the time and frequency domains.

In some examples, the configuration information 215 may indicate corresponding higher layer parameters (e.g., RRC parameters) associated with the resource pools 230. For example, the configuration information 215 may indicate a size of a sidelink resource pool 230, a resource configuration for resources within the sidelink resource pool 230, a sidelink resource allocation mode that is configured for the sidelink resource pool 230, or a resource reservation mode for the sidelink resource pool, or any combination thereof. If the sidelink resource pool 230 is configured with a sidelink resource allocation mode 1, base station 105-*a* may schedule sidelink communications between UE 115-*a*, UE 115-*b*, and one or more other UEs 115. For example, base station 105-*a* may indicate one or more resources that are reserved for sidelink transmission by a transmitting UE 115, such as UE 115-*a* via DCI or via a configuration for a transmitting UE 115. If the sidelink resource pool 230 is configured with a sidelink resource allocation mode 2, sidelink communications may be scheduled based on sensing and resource reservation by one or more transmitting UEs 115. For example, UE 115-*a* may perform channel sensing to identify available resources within the sidelink resource pool 230 and may autonomously (e.g., without signaling from base station 105-*a*) reserve one or more of the available resources for sidelink communications (e.g., via an indication in SCI). Regardless of the sidelink resource allocation mode, transmitting UE 115-*a* may transmit SCI to UE 115-*b* and one or more other receiving UEs 115 to indicate the resource reservation. The sidelink resource allocation mode that is configured for each sidelink resource pool 230 may apply to each UE 115 that uses resources within the sidelink resource pool 230.

A granularity of some sidelink communications (e.g., a minimum granularity for scheduling sidelink transmission and reception) may be a slot 225 in the time domain and a subchannel 220 in the frequency domain. In such cases, each slot 225 (e.g., a semi-static uplink slot, or a semi-static portion of a flexible slot) within each subchannel 220 of a sidelink resource pool 230 may be allocated for sidelink communication. As such, sidelink communications may be slot-based communications. A round-trip time (RTT) that includes, for example, transmitting a sidelink message, receiving a sidelink feedback message corresponding to the sidelink message, and preparing to retransmit the sidelink message, may be relatively long due to the granularity of one transmission per slot and a length of each slot 225 (e.g., which may be based on a configured subcarrier spacing (SCS) value). A latency of the sidelink communication may be reduced by refraining from receiving the sidelink feedback message (e.g., reducing a quantity of transport blocks to be transmitted and received). However, refraining from receiving the sidelink feedback message may reduce a reliability associated with the sidelink message. Accordingly, sidelink communications within a sidelink resource pool that is configured to support slot-based communications may not be sufficiently low-latency or high reliability for some applications that support diverse latency and reliability (e.g., URLLC, industrial internet of things (IIoT), or other applications). Additional aspects of slot-based scheduling may be further described elsewhere herein, including with reference to FIG. 3A.

In some cases, sidelink communications may be mini-slot-based. Each slot 225 within a sidelink resource pool 230 may be divided into a set of mini-slots with gap symbols present between the mini-slots of a slot 225. Each mini-slot may include a subset of time and frequency resources that are allocated for a sidelink control channel (e.g., a PSCCH) and remaining time and frequency resources that are allocated for a sidelink data channel (e.g., a PSSCH). Communications within the sidelink data channel of a mini-slot may be scheduled via the sidelink control channel for the same mini-slot. However, slots 225 that are formatted to include mini-slots may not support relatively large packet sizes (e.g., a data packet size of 32 B or less for IIoT or other applications), and AGC symbols (e.g., a symbol including data repeated from a subsequent symbol) and gap symbols (e.g., null symbols for a device to transition between transmission and reception) between each mini-slot may reduce spectral efficiency and result in increased scheduling overhead, which may degrade associated latency gains. Additional aspects of mini-slot-based scheduling may be further described elsewhere herein, including with reference to FIG. 3B.

In some cases, in order to support diverse latency and reliability associated with some applications, such as URLLC and IIoT services, a base station 105, a UE 115, or both, may utilize one or more features for reducing latency or improving reliability of wireless communications on a communication link 205 (e.g., a Uu link). For example, a base station 105 may perform mini-slot scheduling, span-based physical downlink control channel (PDCCH) scheduling (e.g., a UE 115 may be scheduled for multiple PDCCH occasions in a slot), or both. A UE 115 may support increased processing speeds, physical uplink shared channel (PUSCH) repetition (e.g., PUSCH repetition with Type B), multi-HARQ transmission per slot, or any combination thereof, to improve latency and reliability associated with wireless communications on a communication link 205. However, such features for improving latency and reliability for wireless communications may not apply to communications via a sidelink communication link 210 (e.g., a PC5 link).

As described herein, each slot 225 within a sidelink resource pool 230 may include a control region allocated for a sidelink control channel (e.g., a PSCCH) and a set of subslots each allocated for a sidelink data channel (e.g., a PSSCH) to reduce latency while maintaining adequate reliability (e.g., supporting low-latency sidelink feedback) and improving spectral efficiency for sidelink communications.

The control region and the set of subslots may occupy contiguous symbols within a slot 225 (e.g., the subslots within each slot 225 may be contiguous in the time domain, and may not include gap symbols between each subslot). SCI transmitted within the control region of a slot 225 may schedule communications within one or more subslots of the same slot 225, one or more subslots of other subsequent slots 225, or both. In some examples, the subslots within some or all of the slots 225 may be configured according to a pattern (e.g., a pattern indicative of a quantity of subslots per slot 225 and a length of each subslot) that may be indicated via the configuration information 215 (e.g., the pattern may be semi-statically configured). And in some examples, the pattern according to which the subslots within a slot 225 is configured may be indicated via SCI (e.g., a UE 115 reserving one or more symbols within a slot 225 may indicate a quantity and location of those symbols, which then may be considered a subslot, and in some cases any quantity of additional UEs 115 may reserve sets of one or more other symbols within the slot 225 may indicate a quantity and location of those symbols, in which case each set of one or more other symbols within the slot 225 then may be considered another subslot). Additional aspects of subslot-based scheduling may be further described elsewhere herein, including with reference to FIG. 4.

Each UE 115 communicating within a sidelink resource pool 230 that is configured according to the described resource configuration may either transmit SCI, a corresponding sidelink data message, or both, within a duration of a slot 225 or receive SCI, the corresponding data message, or both, within the duration of the slot 225. As such, there may not be gap symbols (e.g., null resources that provide time for a device to switch between transmission and reception) between subslots within a slot 225. A last symbol within each slot 225 may include a gap symbol, and a first symbol within each slot 225 may include an AGC symbol. A receiving UE 115, such as UE 115-b, may decode the AGC symbol to determine an AGC setting for receiving sidelink data within the slot 225, and the slot 225 may not include other AGC symbols. Each slot 225 may thereby include fewer AGC and gap symbols than mini-slot-based sidelink communications, in which a gap symbol, an AGC symbol, or both may be present between each mini-slot, which may improve spectral efficiency and reduce latency as compared with mini-slot-based sidelink communications or other alternative techniques.

In the example of the wireless communications system 200, UE 115-a (e.g., a transmitting UE 115-a) may transmit SCI within a control region of a first slot 225 and transmit a sidelink message within one or more other subslots in the slot 225 or a subsequent slot 225 that correspond to the SCI. UE 115-b (e.g., a receiving UE 115-b) may receive the SCI indicating a resource reservation, and may monitor for and receive the sidelink message within the indicated one or more other subslots. In some examples, physical sidelink feedback channel (PSFCH) resources for transmitting a sidelink feedback message may be configured within one or more subslots according to a configured HARQ periodicity (e.g., every two subslots, four subslots, or some other quantity of subslots may include PSFCH resources). As such, UE 115-b may transmit a sidelink feedback message (e.g., a HARQ acknowledgement (ACK) or negative acknowledgement (NACK) message) to UE 115-a via PSFCH resources within a sub slot in response to receiving the sidelink message. A RTT for transmitting a sidelink message, receiving a sidelink feedback message, and preparing to retransmit the sidelink message may thereby be shorter for a sidelink communication scheduled according to a subslot granularity than a RTT for a sidelink communication scheduled according to a slot granularity, which may provide for reduced latency while maintaining reliability of the sidelink communication.

A SCI message may reserve one or more non-contiguous subslots (e.g., in the same or different slots 225) for one or more respective transmissions or retransmissions of a sidelink message (e.g., each transport block may be mapped to a single subslot according to a resource reservation mode 1), a group of contiguous subslots for a transmission or retransmission of a sidelink message (e.g., each transport block may be mapped to two or more subslots according to a resource reservation mode 2), or both. The resource reservation mode may be configured for each sidelink resource pool 230, and UEs 115-a and 115-b may receive an indication of the configured resource reservation mode via the configuration information 215. Additionally or alternatively, the resource reservation mode may be indicated to UEs 115-a, 115-b, or both, via signaling such as SCI or DCI.

Accordingly, a physical layer structure for a sidelink resource pool 230 may reduce latency by allocating a control region for a PSCCH and a set of contiguous subslots for a PSSCH within each slot 225 of the sidelink resource pool 230. A base station 105 (e.g., during sidelink resource allocation mode 1) or a UE 115 (e.g., during sidelink resource allocation mode 2) may thereby schedule sidelink communications according to a subslot granularity, which may improve spectral efficiency, reduce latency, and maintain reliability associated with sidelink communications.

Figure 3A:
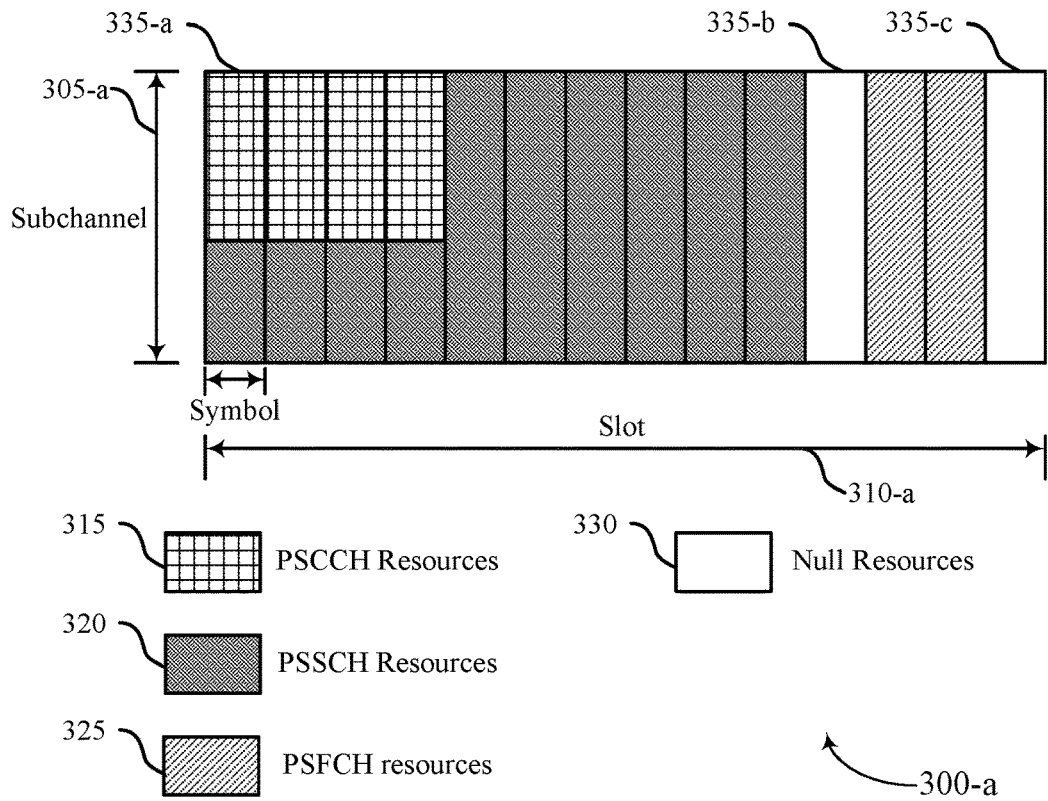
FIGS. 3A and 3B illustrate examples of sidelink resource configurations that support slot format for low latency sidelink communications in accordance with aspects of the present disclosure.
Figure 3B:
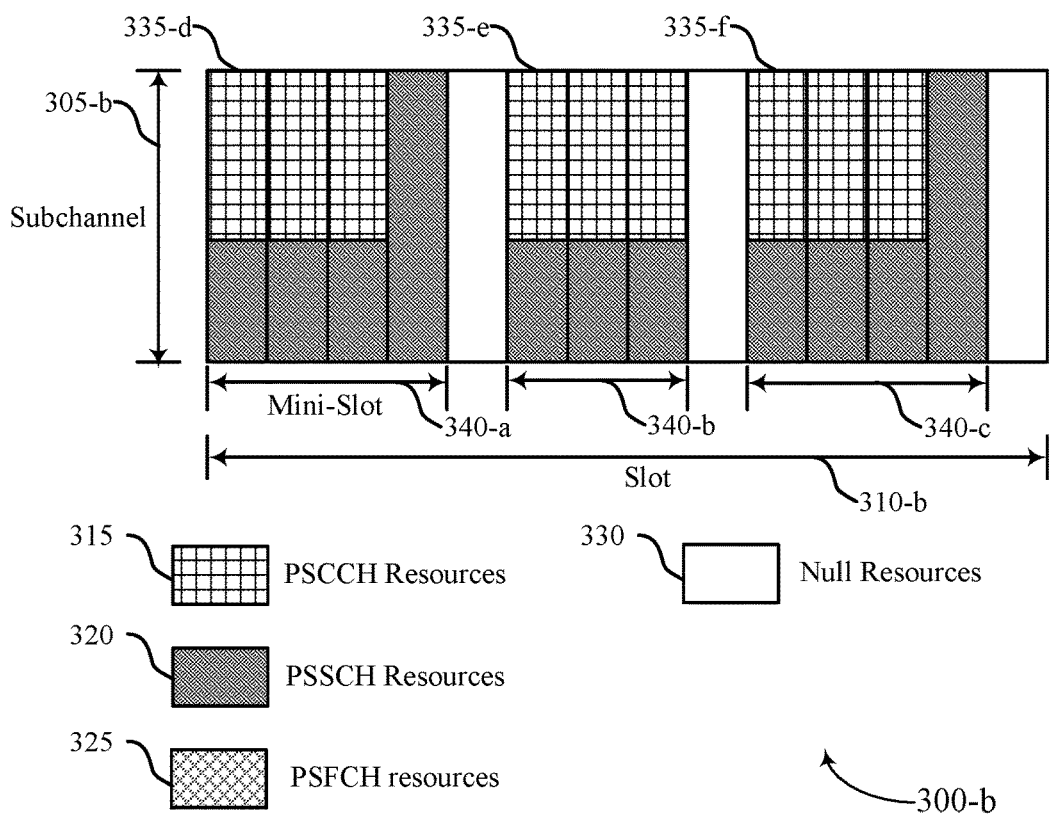

FIGS. 3A and 3B illustrate examples of sidelink resource configurations 300-a and 300-b that support slot format for low latency sidelink communications in accordance with aspects of the present disclosure. Sidelink resource configurations 300-a and 300-b may implement or be implemented by some aspects of the wireless communications systems 100 or 200. For example, sidelink resource configurations 300-a and 300-b may illustrate example resource configurations for scheduling, by a UE 115 or a base station 105, and performing, by a UE 115, sidelink communications, where the UE 115 and the base station 105 may represent examples of a UE 115 and a base station 105 as described with reference to FIGS. 1 and 2.

The sidelink resource configurations 300-a and 300-b may each illustrate example configurations of time and frequency resources within a slot 310 and a subchannel 305 of a sidelink resource pool, which may be examples of a slot 225, a subchannel 220, and a sidelink resource pool 230, as described with reference to FIG. 2. Each slot 310 may include a quantity (e.g., 14, or some other number) of symbols 335 in the time domain. Each subchannel 305 may include a quantity (e.g., sl-SubchannelSize) of contiguous PRBs (not shown) in the frequency domain. The time and frequency resources within each slot 310 and subchannel 305 may be allocated as PSCCH resources 315, PSSCH resources 320, PSFCH resources 325, null resources 330, other types of resources, or any combination thereof.

In a first example illustrated by FIG. 3A, sidelink resource configuration 300-a may support slot-based sidelink communications, such that a granularity of the sidelink communications (e.g., a minimum granularity of each sidelink transmission or reception) may be a slot 310. Each slot 310 within each subchannel 305 (e.g., each time and frequency unit) within a corresponding sidelink resource pool, such as slot 310-a within subchannel 305-a, may include a quantity of time and frequency resources allocated as PSCCH resources 315 and a quantity of time and frequency resources allocated as PSSCH resources 320.

If the sidelink resource pool is configured for sidelink resource allocation mode 2, a transmitting UE 115 may transmit SCI within the PSCCH resources 315 of slot 310-a to reserve the PSSCH resources 320 for transmission of a sidelink message (e.g., a transport block) within slot 310-a. In some examples, the SCI may reserve the PSSCH resources 320 within one or more slots 310 subsequent to slot 310-a for retransmission of the sidelink message. If the sidelink resource pool is configured for sidelink resource allocation mode 1, a base station 105 may schedule a slot 310 for each scheduled sidelink message or retransmission of a sidelink message (e.g., a slot 310 may be reserved for each transport block). Accordingly, sidelink resource configuration 300-a may support transmission or reception of one transport block within each slot 310 in a resource pool.

A last symbol 335 of slot 310-a (e.g., symbol 335-c) and each other slot 310 within the sidelink resource pool may be a gap symbol 335 that may include null resources 330, which may provide time for a UE 115 to switch between transmission and reception after each slot 310. A first symbol 335 of slot 310-a (e.g., symbol 335-a) and each other slot 310 within the resource pool may be configured as an AGC symbol 335. AGC symbol 335-a may include a copy of the sidelink data or control information that is transmitted within the resources of the subsequent symbol 335. A receiving UE 115 may decode AGC symbol 335-a to determine an AGC setting for slot 310-a. The UE 115 may receive a sidelink message within slot 310-a according to the determined AGC setting.

The configuration of sidelink feedback (e.g., HARQ feedback via the PSFCH resources 325) according to sidelink resource configuration 300-a may be slot-based. For example, the PSFCH resources 325 may be allocated within some quantity of slots 310 of the resource pool that are indicated by an offset and a periodicity value. The offset and periodicity values may be configured (e.g., via higher layers) in units of slots 310 (e.g., the periodicity for a resource pool may be one of {0 (no PSFCH), 1, 2, or 4}, or some other quantity of slots 310). In one example, if the periodicity of the resource pool that includes slot 310-a is two or more, slot 310-a may include PSFCH resources 325, and a slot 310 subsequent to slot 310-a within the resource pool may not include PSFCH resources 325. Null resources 330 may be allocated within symbol 335-b prior to the PSFCH resources 325 and symbol 335-c subsequent to the PSFCH resources 325 in the time domain to provide for transmission and reception switching by the sidelink UEs 115. A slot 310 that does not include PSFCH resources 325 may include more PSSCH resources 320 than slot 310-a.

Sidelink feedback (e.g., a HARQ ACK or NACK message) may be transmitted by a receiving UE 115 to indicate whether a sidelink message is successfully received and decoded. The sidelink feedback may be transmitted in a second slot 310 subsequent to a first slot 310 in which the sidelink message is transmitted. For example, if a sidelink message is received by a receiving UE 115 in a first slot 310, which may be slot n, the receiving UE 115 may transmit a sidelink feedback message within the PSFCH resources 325 of slot 310-a, which may be slot n+2, or another slot 310 subsequent to slot 310-a (e.g., the earliest slot 310 in which the feedback may be transmitted may be two slots 310 after the initial transmission of the sidelink message). The transmitting UE 115 may receive the sidelink feedback message and retransmit the sidelink message within the PSSCH resources 320 of a slot n+3, or another slot 310 subsequent to slot n+3 (e.g., the earliest slot 310 in which the sidelink message may be retransmitted may be three slots 310 after the initial transmission of the sidelink message). In some cases, the sidelink feedback and corresponding retransmission may be transmitted according to a larger gap depending on the configured feedback periodicity for the sidelink resource pool 230. As such, the RTT between transmitting a sidelink message and preparing to retransmit the sidelink message based on sidelink feedback may be relatively large. In one example, if the SCS is 30 kHz, each slot may be 0.5 ms and the RTT may be 1.5 ms or longer. As such, a RTT associated with slot-based sidelink communications may not be sufficiently low-latency for some applications.

In some cases, if the initial transmission of a sidelink message is relatively conservative (e.g., if a low coding rate is used, blind repetition is used, or both), the sidelink message may be transmitted reliably (e.g., with a block error rate (BLER) less than 1e-6, or some other value) within a sufficiently short time period that may be supported by some applications (e.g., 1 ms or less for IIoT applications). However, if the transmission parameters are set relatively conservatively, the sidelink message may occupy more resources, which may result in increased congestion within the system and an increased probability of collision between sidelink packets. Sidelink communications having a slot granularity, as illustrated in FIG. 3A, may thereby not support sufficiently low-latency and high reliability communications for some applications.

In a second example illustrated by FIG. 3B, sidelink resource configuration 300-b may support mini-slot-based sidelink communications, such that a granularity (e.g., a minimum granularity) of each sidelink transmission or reception may be a mini-slot 340. For example, slot 310-b may be divided into three mini-slots 340-a, 340-b, and 340-c, which may each include three symbols 335, four symbols 335, or some other quantity of symbols 335 according to a configured pattern.

Each mini-slot 340 may include some resources allocated as PSCCH resources 315 and some resources allocated as PSSCH resources 320. Null resources 330 may be present in gap symbols 335 between each mini-slot 340. In some examples, a resource pool may be configured with a pattern indicative of a quantity of mini-slots 340 within each slot 310, a duration of each mini-slot 340, and corresponding resource allocations within each mini-slot 340. A set of UEs 115 may receive configuration information indicating the resource pool and the configured mini-slot 340 resource pattern for the resource pool. During sidelink resource allocation mode 2, the UEs 115 may monitor for or transmit resource reservation information via SCI within the PSCCH resources 315 of each mini-slot 340 according to the configured pattern. The SCI may schedule a sidelink transmission within the PSSCH resources 320 of the same mini-slot 340 (e.g., each mini-slot 340 may be self-decodable). During sidelink resource allocation mode 1, a base station 105 may reserve a mini-slot 340 for each sidelink message. Accordingly, each sidelink message (e.g., transport block) may be mapped to one mini-slot 340.

The mini-slot-based sidelink communications may support reduced latency and RTT as compared with slot-based sidelink communications. For example, a RTT between transmitting a sidelink message and retransmitting the sidelink message within mini-slots 340 may be shorter than a RTT for transmitting and retransmitting a sidelink message within slots 310 (e.g., due to a shorter duration of the mini-slots 340 than the slots 310). However, the mini-slots 340 may not support relatively large data packet sizes (e.g., a data packet supported by a mini-slot 340 may be 32 B or less for IIoT, or some other data packet size).

As a quantity of mini-slots 340 within each slot 310 increases, a scheduling latency for the sidelink communications may decrease, but a quantity of gap symbols 335 including the null resources 330 and a quantity of AGC symbols 335 (e.g., AGC symbols 335-d, 335-e, and 335-f) may increase. Overhead associated with the gap symbols 335 and AGC symbols 335 may degrade latency reduction gains provided by the mini-slots 340. As such, sidelink communications scheduled according to the mini-slots 340 as illustrated in FIG. 3B may not support sufficiently low latency and sufficiently high reliability for some applications.

Accordingly, sidelink resource configurations 300-a and 300-b may not support applications, such as URLLC services or IIoT communications, that are associated with relatively low latency and relatively high reliability requirements due to deficiencies in spectral efficiency, overhead, latency, small data packet sizes, or any combination thereof. As such, it may be beneficial to introduce a resource configuration for sidelink resources that supports such applications. As described herein, resources within a sidelink resource pool may be allocated according to a subslot granularity. Each slot 310 of a resource pool may include a control region allocated for the PSCCH resources 315 and a set of contiguous subslots allocated for the PSSCH resources 320. Such a resource configuration may reduce latency and improve spectral efficiency for sidelink communications while maintaining reliability, and may be described in further detail with reference to FIG. 4.

Figure 4:
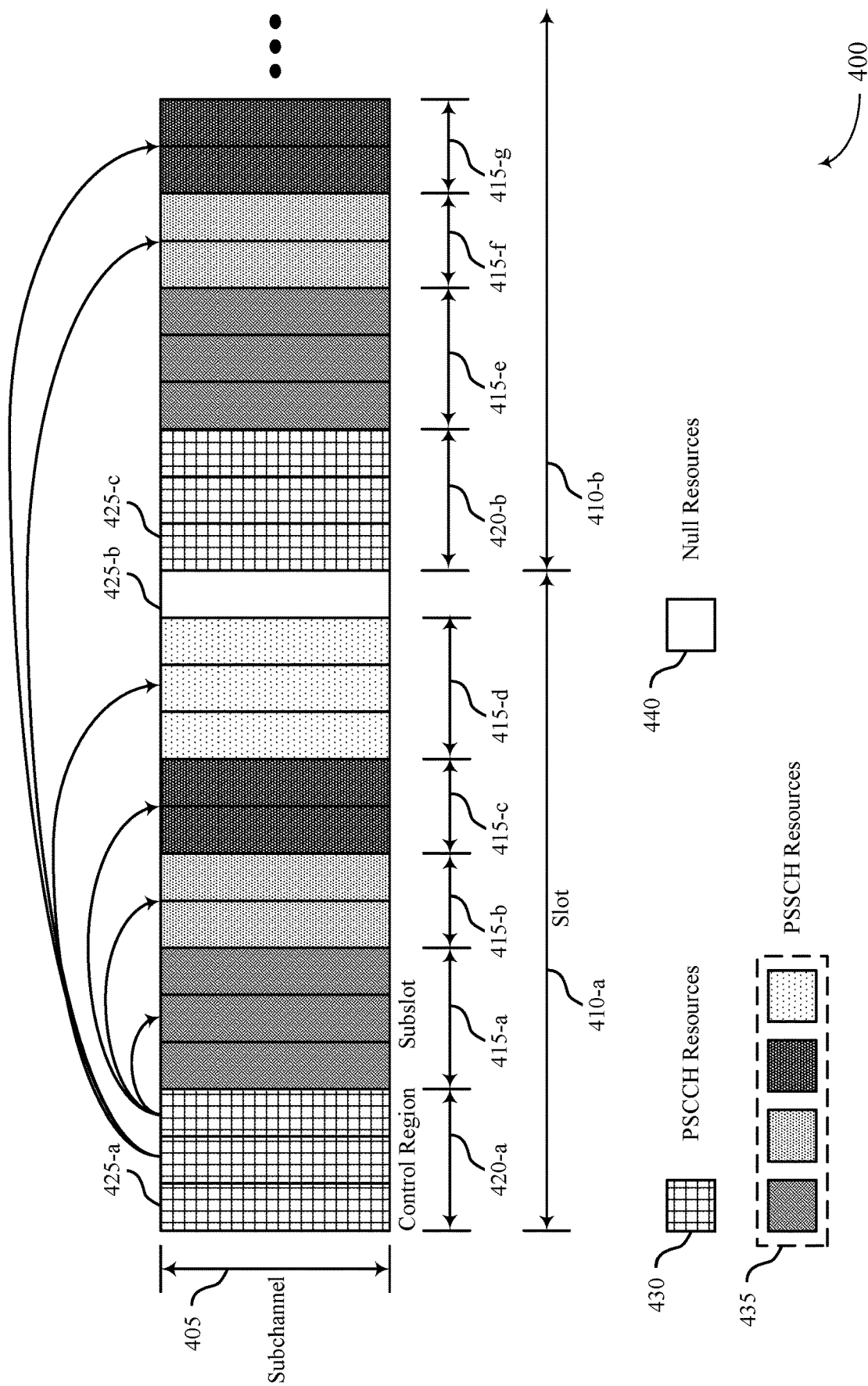
FIG. 4 illustrates an example of a sidelink resource configuration that supports slot format for low latency sidelink communications in accordance with aspects of the present disclosure.

FIG. 4 illustrates an example of a sidelink resource configuration 400 that supports slot format for low latency sidelink communications in accordance with aspects of the present disclosure. The sidelink resource configuration 400 illustrates an example configuration of sidelink resources within a subchannel 405 and slots 410-a and 410-b, which may be examples of subchannels and slots within a sidelink resource pool as described with reference to FIGS. 2 and 3. Slots 410-a and 410-b may each include a control region 420 allocated for PSCCH resources 430 and a set of contiguous subslots 415 allocated for PSSCH resources 435. Although slots 410-a and 410-b of the sidelink resource configuration 400, a sidelink resource pool may include any quantity of slots. In some cases, each slot may span a subchannel in the frequency domain, and the slots of a sidelink resource pool may collectively span any quantity of subchannels.

Slots 410-a, 410-b, and the subchannel 405 may be included in a sidelink resource pool configured for a group of UEs 115, and each resource unit of the sidelink resource pool (e.g., each slot 410 and subchannel 405 unit) may be configured with the sidelink resource configuration 400. For example, a group of UEs 115 may receive configuration information for the sidelink resource pool, where each slot 410 within the sidelink resource pool may include a control region 420 and a set of contiguous subslots 415. In some cases, the configuration information may include a configured pattern (e.g., a dynamic or pre-configured pattern) for the subslots 415 that may indicate a quantity of subslots 415 within a slot 410 and a length of each subslot 415. Each subslot 415 subject to the pattern may include a quantity of symbols 425 (e.g., two symbols 425, three symbols 425, or some other quantity of symbols 425 per subslot 415) in accordance with the indicated pattern. Additionally or alternatively, and a UE that reserves one or more subslots via SCI may indicate (e.g., via the SCI) a quantity of symbols that are reserved, with the reserved symbols representing a subslot, and thus a pattern for the subslots 415 within a slot 410 may be dynamically and flexibly configured through the reservation of symbols corresponding to the subslots by one or more corresponding UEs 115. In some examples, the slots 410 within a sidelink resource pool may or may not be contiguous. In the example of the sidelink resource configuration 400, slots 410-a and 410-b may be contiguous in the time domain.

Each UE 115 of the group of UEs 115 may either transmit or receive sidelink data or SCI within each slot 410. For example, in slot 410-b, a transmitting UE 115 may transmit SCI within control region 420-b to reserve one or more of subslots 415-e, 415-f, or 415-g, or one or more other subslots 415 of a subsequent slot 410 (not pictured). The transmitting UE 115 may subsequently transmit a sidelink message within the reserved subslot(s) 415. A receiving UE 115 may receive SCI within control region 420-b and may receive the corresponding sidelink message within the one or more other subslots 415 that are reserved by the SCI. In some cases, the UEs 115 may not switch between transmission and reception within a duration of a slot 410, and thus the control region 420 and subslots 415 may occupy contiguous symbols 425 within the slot 410 (e.g., there may not be gap symbols 425 between subslots 415). A last symbol of each slot 410 (e.g., symbol 425-b of slot 410-a) may include null resources 440 to provide time for the UEs 115 to switch between transmission and reception after each slot 410. A symbol 425 that includes null resources 440 may be referred to as a gap symbol 425.

A first symbol 425 of each slot 410 (e.g., symbol 425-a of slot 410-a and symbol 425-c of slot 410-b) may be an AGC symbol 425 and may include a repetition of the sidelink data or control information transmitted within a subsequent symbol 425. A receiving UE 115 may decode the AGC symbol 425 of a slot 410 to determine an AGC setting for each symbol 425 in the slot 410 (e.g., the AGC setting may be common for each symbol 425 and each subslot 415 in the slot 410). Sidelink communications that are scheduled and performed according to a subslot granularity, as illustrated by the sidelink resource configuration 400, may thereby include fewer gap symbols 425 and AGC symbols 425 than sidelink communications that are scheduled and performed according to a mini-slot granularity, as discussed with respect to FIG. 3B, or alternative techniques. The sidelink resource configuration 400 may thereby support reduced congestion, efficient utilization of sidelink resources, and improved spectral efficiency for sidelink communications as compared with alternative techniques.

If the sidelink resource pool including slots 410-a and 410-b is configured for sidelink resource allocation mode 2, one or more transmitting UEs 115 may transmit one or more SCI in control regions 420-a, 420-b, or both, to autonomously (e.g., without signaling from a base station 105) reserve resources within the sidelink resource pool for a sidelink message. If the sidelink resource pool is configured for sidelink resource allocation mode 1, a base station 105 may schedule sidelink communications such that one or more subslots 415 are reserved for each transport block, and the one or more transmitting UEs 115 may transmit an indication of the scheduled communications and resource reservation to one or more receiving UEs 115 via SCI in control regions 420-a, 420-b, or both. In the example of the sidelink resource configuration 400, control regions 420-a and 420-b may include resources allocated as PSCCH resources 430 for carrying the SCI. Each SCI may reserve resources within one or more subslots 415 in the same slot 410 or subsequent slots 410 for transmission of a packet, retransmission of a packet, or both. Although slots 410-*a* and 410-*b* of the sidelink resource configuration 400 span a subchannel 405 in the frequency domain, a sidelink resource pool may include any quantity of slots 410 that may span any quantity of subchannels 405. As such, a SCI transmitted within control region 420-*a*, control region 420-*b*, or both, may reserve sidelink resources within one or more other slots 410 within the same subchannel or one or more different subchannels 405 in the frequency domain. Thus, for example, though the example illustrated in FIG. 4 shows slot 410-*b* as in the same subchannel 405 as slot 410-*a*, slot 410-*b* could in some cases be in a different subchannel 405 than slot 410-*a*.

Sidelink resources within a sidelink resource pool may be reserved according to two or more resource reservation modes. A first resource reservation mode (e.g., resource reservation mode 1) may correspond to reserving a single subslot 415 per transport block. A second resource reservation mode (e.g., resource reservation mode 2) may correspond to reserving a group of contiguous subslots 415 per transport block. In some examples, the resource reservation mode 1 may provide for more latency reduction than resource reservation mode 2. Additionally or alternatively, the resource reservation mode 2 may provide for improved coverage extension as compared with the resource reservation mode 1.

A base station 105 (e.g., during resource allocation mode 1) or a transmitting UE 115 (e.g., during resource allocation mode 2) may reserve subslots 415 for sidelink communications according to one of the first or second resource reservation modes. For example, the base station 105 may transmit DCI to one or more transmitting UEs 115, or may configure the one or more transmitting UEs 115 with a set of sidelink resources to reserve resources and schedule sidelink communications in accordance with a selected resource reservation mode. Additionally or alternatively, a transmitting UE 115 may autonomously select the resource reservation mode. In either case, the transmitting UE 115 may configure each SCI message in accordance with the selected resource reservation mode. In some examples, each resource pool may be configured with a resource reservation mode, and the configured resource reservation mode may be indicated to the group of UEs 115 via configuration information for the resource pool. Additionally or alternatively, a base station or transmitting UE 115 may selected the resource reservation mode. The base station 105 may transmit an indication of the selected resource reservation mode to one or more receiving and transmitting UEs 115 via DCI. The transmitting UE 115 may transmit an indication of the selected resource reservation mode to one or more receiving UEs 115 via SCI. A receiving UE 115 may receive an indication of the resource reservation mode and perform rate matching to prepare for accurately receiving and decoding the corresponding sidelink communications.

In the example of FIG. 4, subslots 415-*d*, 415-*f*, and 415-*g* may be reserved for independent transmissions according to the resource reservation mode 1. For example, SCI transmitted within control region 420-*a* may reserve the PSSCH resources 435 within subslots 415-*d*, 415-*f*, and 415-*g* for respective sidelink transmissions (e.g., each subslot 415 may be reserved for transmission of a single transport block). In one example, a transmitting UE 115 may reserve subslot 415-*d* for transmission of a sidelink message, and the transmitting UE 115 may reserve subslots 415-*f* and 415-*g* each for a retransmission of the sidelink message or a transmission of a second sidelink message.

A receiving UE 115 may receive the sidelink message within subslot 415-*d*, and the receiving UE 115 may transmit sidelink feedback within a subslot subsequent to subslot 415-*d* that includes PSFCH resources. In one example (not pictured), subslot 415-*e* may include PSFCH resources, and the receiving UE 115 may transmit a sidelink feedback message to the transmitting UE 115 via subslot 415-*e*. The transmitting UE 115 may receive the sidelink feedback message and retransmit the sidelink message within one of subslot 415-*f* or subslot 415-*g* that was reserved by the SCI transmitted in control region 420-*a*. In some examples (e.g., if both resource reservation mode 1 and mode 2 are supported simultaneously), subslots 415-*f* and 415-*g* may be reserved and bundled together for the retransmission. In other examples, a first SCI transmitted in control region 420-*a* may reserve subslot 415-*d* for transmission of a sidelink message and a second SCI transmitted in control region 420-*b* may reserve subslot 415-*f* or subslot 415-*g*, or both, for a retransmission of the sidelink message.

In the example of FIG. 4, subslots 415-*a*, 415-*b*, and 415-*c* may be reserved for transmission of a single transport block according to the resource reservation mode 2. For example, SCI transmitted via the PSCCH resources 430 in control region 420-*a* may reserve the PSSCH resources 435 within each of subslots 415-*a*, 415-*b*, and 415-*c* for a sidelink message or a retransmission of a sidelink message. A transmitting UE 115 may bundle subslots 415-*a*, 415-*b*, and 415-*c* and transmit a single transport block (e.g., a sidelink message or a retransmission) within the PSSCH resources 435 spanning across each subslot 415 of the bundled group of subslots 415-*a*, 415-*b*, and 415-*c*. The transmitting UE 115 may thereby transmit a relatively large data packet using the proposed subslot structure. A group of subslots 415 that are reserved for a single transport block according to resource reservation mode 2 may include contiguous subslots 415 that are each located within a same slot 410.

In some examples, one or more subslots 415 within a resource pool may be reserved according to both resource reservation mode 1 and resource reservation mode 2 simultaneously. For example, a first UE 115 may transmit a first SCI within control region 420-*a* to reserve subslots 415-*d*, 415-*f*, and 415-*g* according to resource reservation mode 1 and a second UE 115 may transmit a second SCI within control region 420-*a* to reserve subslots 415-*a*, 415-*b*, and 415-*c* according to resource reservation mode 2. Additionally or alternatively, both the first and second SCI may be transmitted by the same UE 115, or a single SCI transmitted within control region 420-*a* may reserve multiple subslots 415 according to both resource reservation modes simultaneously. For example, a UE 115 may transmit SCI within control region 420-*a* to reserve subslot 415-*d* for transmission of a sidelink message, and subslots 415-*f* and 415-*g* together for transmission of a second sidelink message or for a retransmission of the sidelink message (e.g., for a single transport block). The SCI may thereby reserve a single subslot 415-*d* for a transport block according to resource reservation mode 1, and the SCI may reserve a group of contiguous subslots for a single transport block according to resource reservation mode 2.

If both resource reservation mode 1 and resource reservation mode 2 are supported simultaneously, a transmitting UE 115 may transmit an indication of the supported resource reservation modes 1 and 2 to a receiving UE 115 via SCI (e.g., an indication in SCI1). Additionally or alternatively, during sidelink resource allocation mode 1, a base station 105 may transmit an indication of the supported resource reservation modes 1 and 2 to a transmitting UE 115, a receiving UE 115, or both, via DCI (e.g., via an explicit indication in DCI3-x).

Accordingly, sidelink communications within a sidelink resource pool may be scheduled and performed according to a subslot format (e.g., a sidelink physical layer resource configuration), as illustrated by the sidelink resource configuration 400. Scheduling and performing sidelink communications within sets of contiguous subslots 415 may support reduced latency, improved spectral efficiency, and improved reliability as compared with slot-based techniques, mini-slot-based techniques, or other techniques.

Figure 5:
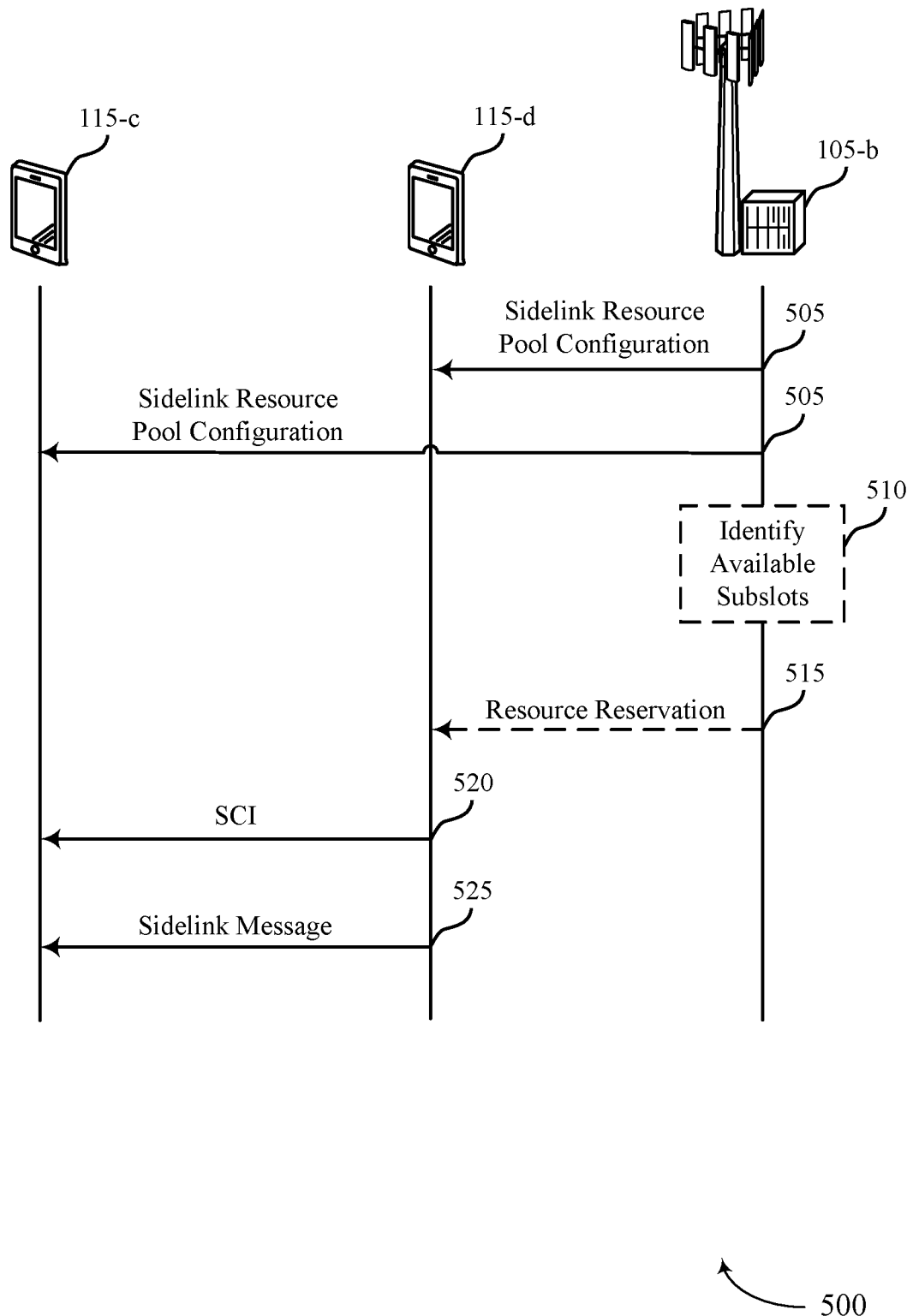
FIG. 5 illustrates an example of a process flow that supports slot format for low latency sidelink communications in accordance with aspects of the present disclosure.

FIG. 5 illustrates an example of a process flow 500 that supports slot format for low latency sidelink communications in accordance with aspects of the present disclosure. The process flow 500 may implement or be implemented by some aspects of the wireless communications systems 100 or 200. For example, the process flow 500 may illustrate techniques for scheduling and performing sidelink communications between two or more UEs 115, where the UEs 115 may represent examples of a UE 115 as described with reference to FIGS. 1-4. In some examples, the UEs 115 may receive configuration information from a base station 105 indicating a sidelink resource pool configured for the UEs 115, where the base station 105 may represent an example of a base station 105 described with reference to FIGS. 1-4. In some examples, the sidelink communications may be scheduled and performed within slots that are formatted to include subslots, as described with reference to the sidelink resource configuration 400 illustrated in FIG. 4.

In the following description of the process flow 500, the operations between UE 115-*c*, UE 115-*d*, and base station 105-*b* may be performed in a different order than the order shown, or the operations performed by UE 115-*c*, UE 115-*d*, and base station 105-*b* may be performed in different orders or at different times. For example, certain operations may be left out of the process flow 500, or other operations may be added. Although UE 115-*c*, UE 115-*d*, and base station 105-*b* are shown performing the operations of the process flow 500, some aspects of some operations may also be performed by one or more other wireless devices.

At 505, base station 105-*b* may transmit an indication of a configuration of a sidelink resource pool to a group of UEs 115 that includes UEs 115-*c* and 115-*d*. The sidelink resource pool may include one or more slots in a time domain and one or more subchannels in a frequency domain. A slot (e.g., within a subchannel) of the sidelink resource pool may include a control region allocated for a sidelink control channel (e.g., PSCCH) and a set of contiguous subslots each allocated for a sidelink data channel (e.g., PSSCH). In some examples, the indication of the configuration may be transmitted via higher layer signaling (e.g., RRC signaling), and may indicate a sidelink resource allocation mode configured for the resource pool, a resource reservation mode configured for the resource pool, or both.

At 510, in some examples, (e.g., during a sidelink resource allocation mode 1), base station 105-*b* may identify one or more subslots of a set of contiguous subslots within a slot that are available for sidelink communications.

At 515, in some examples, base station 105-*b* may transmit a resource reservation indication to UE 115-*d*, or one or more other transmitting UEs 115 of the group of UEs 115, or both. The resource reservation indication may indicate that the one or more subslots are reserved for sidelink communications by UEs 115-*d*. The resource reservation indication may be transmitted via DCI. Additionally or alternatively, the resource reservation indication may configure UE 115-*d*, the one or more other transmitting UEs 115, or both, with a set of subslots that are allocated for sidelink communications by the UEs 115.

At 520, UE 115-*d* (e.g., a transmitting UE 115-*d*) may transmit SCI to UE 115-*c*. UE 115-*d* may transmit the SCI in the control region of a slot. The SCI may reserve a subslot of the slot for a sidelink message to UE 115-*c*. In some examples, UE 115-*d* may perform sensing and resource reservation to identify available resources within one or more subslots autonomously (e.g., without signaling from base station 105-*b*), and UE 115-*d* may transmit the SCI to reserve resources for sidelink communications according to a sidelink resource allocation mode 2. Additionally or alternatively, UE 115-*d* may receive the resource reservation indication from base station 105-*b* (e.g., during a sidelink resource allocation mode 1), and UE 115-*d* may transmit the SCI to UE 115-*c* and one or more other receiving UEs 115 to indicate the resource reservation.

At 525, UE 115-*d* may transmit at least a portion of a sidelink message (e.g., a transport block) to UE 115-*c* via the subslot indicated by the SCI (e.g., or the resource reservation indication). In some examples (e.g., during a resource reservation mode 1), UE 115-*d* may transmit the sidelink message to UE 115-*c* via the subslot. In other examples (e.g., according to a resource reservation mode 2), UE 115-*d* may transmit the sidelink message to UE 115-*c* via the subslot and a group of one or more other subslots that are contiguous with the subslot.

Figure 6:
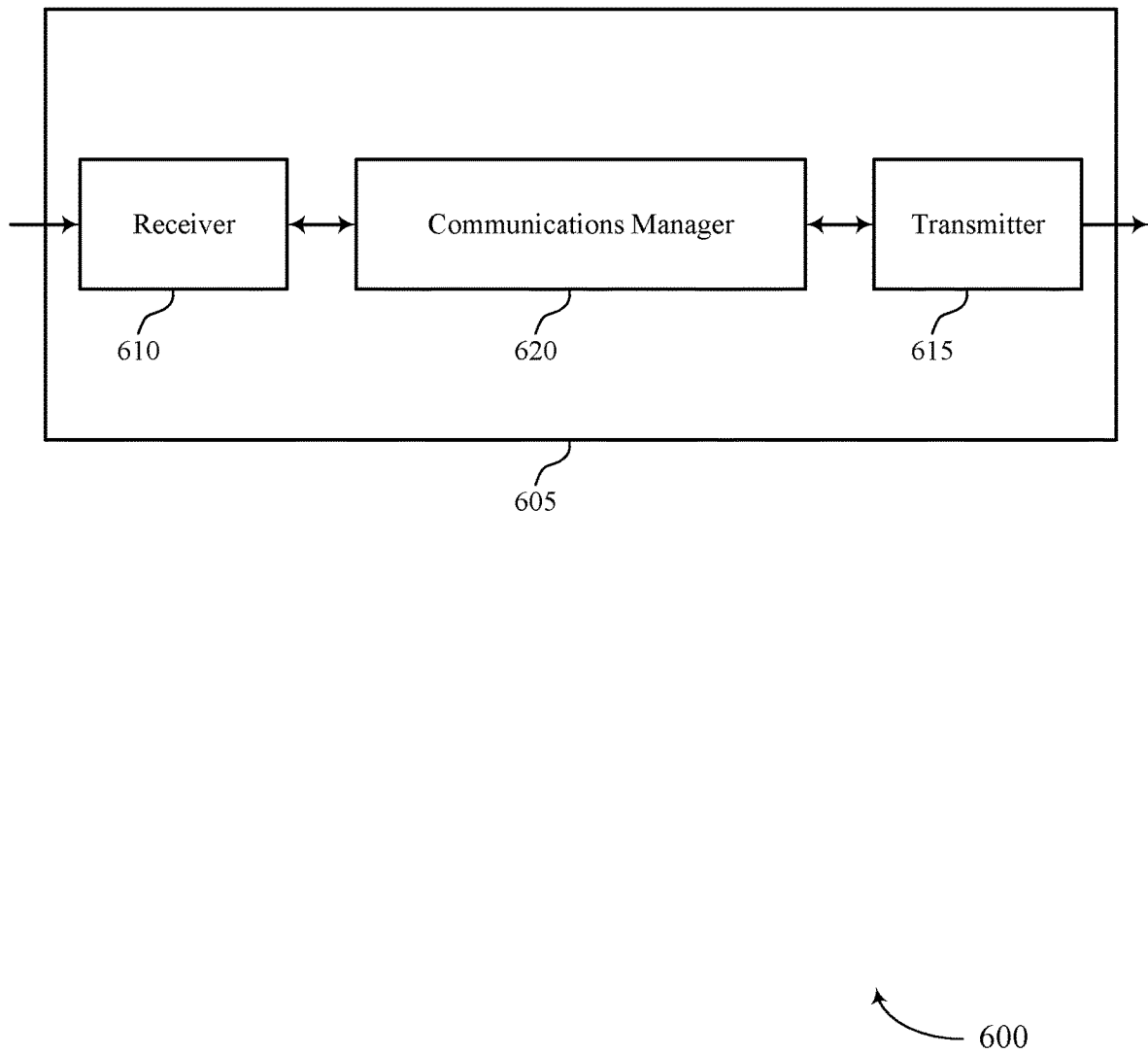
FIGS. 6 and 7 show block diagrams of devices that support slot format for low latency sidelink communications in accordance with aspects of the present disclosure.

FIG. 6 shows a block diagram 600 of a device 605 that supports slot format for low latency sidelink communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to slot format for low latency sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to slot format for low latency sidelink communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of slot format for low latency sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610. The communications manager 620 may send information to the transmitter 615. The communications manager 620 may be integrated in combination with the receiver 610, the transmitter 615, or both to receive information, transmit information, or perform various other operations as described herein.

The communications manager 620 may support wireless communications by a first UE in accordance with examples as disclosed herein. For example, the communications manager 620 may be configured as or otherwise support a means for receiving an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The communications manager 620 may be configured as or otherwise support a means for transmitting, to a second UE of the group of UEs in the control region of the slot, SCI that reserves a subslot of the slot for a sidelink message to the second UE. The communications manager 620 may be configured as or otherwise support a means for transmitting at least a portion of the sidelink message to the second UE in the subslot.

Additionally or alternatively, the communications manager 620 may support wireless communications at a second UE in accordance with examples as disclosed herein. For example, the communications manager 620 may be configured as or otherwise support a means for receiving an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The communications manager 620 may be configured as or otherwise support a means for receiving, from the first UE in the control region of the slot, SCI that reserves a subslot of the set of contiguous subslots for a sidelink message to the second UE. The communications manager 620 may be configured as or otherwise support a means for receiving the sidelink message from the first UE at least partially in the subslot.

By including or configuring the communications manager 620 in accordance with examples as described herein, the device 605 (e.g., a processor controlling or otherwise coupled to the receiver 610, the transmitter 615, the communications manager 620, or any combination thereof) may support techniques for reduced processing, reduced latency, and more efficient utilization of communication resources. For example, by scheduling and performing sidelink communications within a set of contiguous subslots in each slot, the processor of the device 605 may monitor a single control region per slot, which may reduce processing as compared with monitoring multiple control regions per slot (e.g., within each mini-slot). Additionally or alternatively, by transmitting SCI within the single control region to schedule sidelink transmissions within one or more subslots in the same slot or a different slot, the processor may further reduce processing and latency. In some examples, a slot may include a single AGC symbol and a single gap symbol, and the remaining symbols of the slot may be allocated for sidelink data or SCI, which may support more efficient utilization of communication resources, reduced processing (e.g., the processor of the device 605 may refrain from switching between transmission and reception within a slot), and reduced latency.

Figure 7:
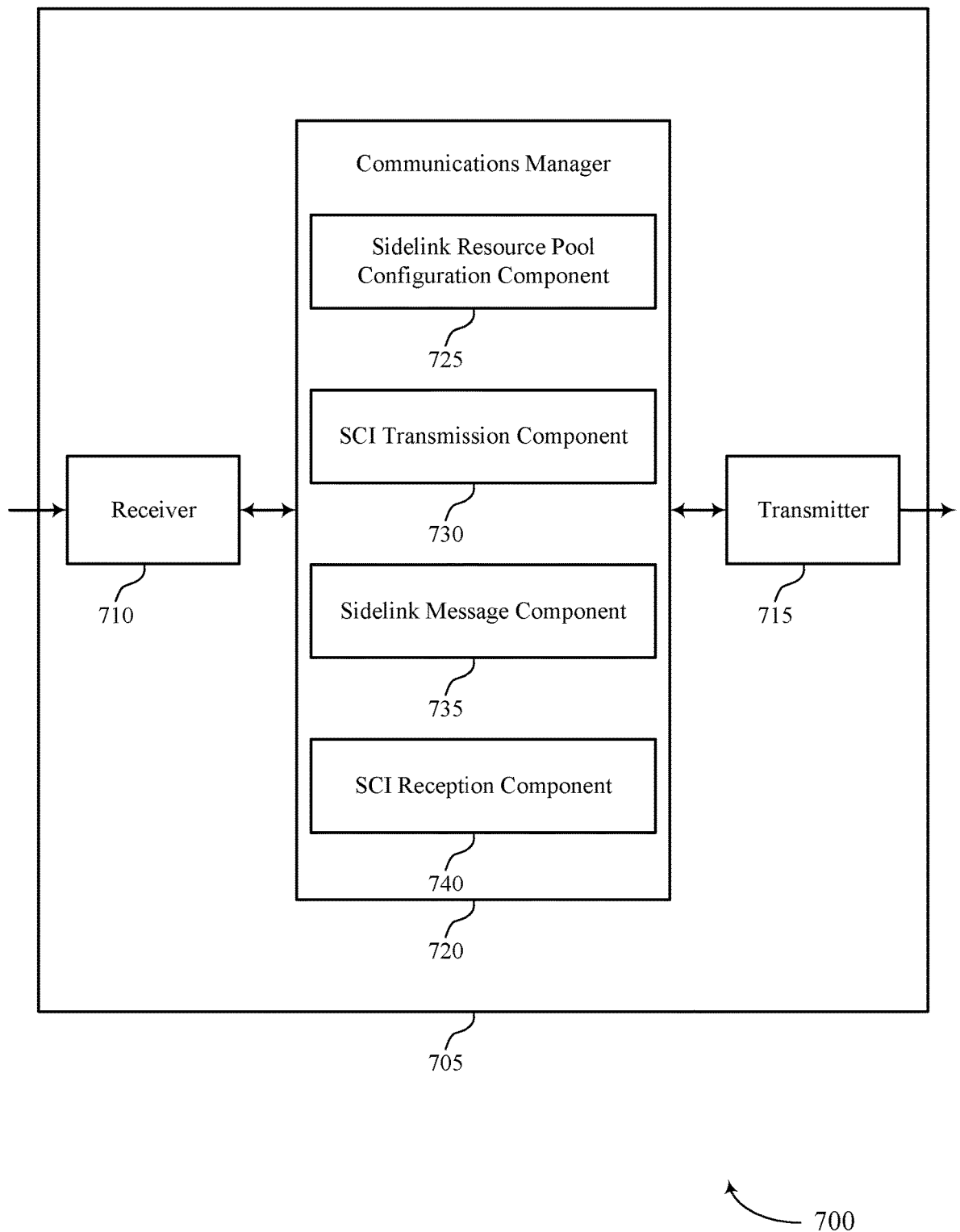

FIG. 7 shows a block diagram 700 of a device 705 that supports slot format for low latency sidelink communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to slot format for low latency sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to slot format for low latency sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of slot format for low latency sidelink communications as described herein. For example, the communications manager 720 may include a sidelink resource pool configuration component 725, an SCI transmission component 730, a sidelink message component 735, an SCI reception component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710. The communications manager 720 may send information to the transmitter 715. The communications manager 720 may be integrated in combination with the receiver 710, the transmitter 715, or both to receive information, transmit information, or perform various other operations as described herein.

The communications manager 720 may support wireless communications by a first UE in accordance with examples as disclosed herein. The sidelink resource pool configuration component 725 may be configured as or otherwise support a means for receiving an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The SCI transmission component 730 may be configured as or otherwise support a means for transmitting, to a second UE of the group of UEs in the control region of the slot, SCI that reserves a subslot of the slot for a sidelink message to the second UE. The sidelink message component 735 may be configured as or otherwise support a means for transmitting at least a portion of the sidelink message to the second UE in the subslot.

Additionally or alternatively, the communications manager 720 may support wireless communications at a second UE in accordance with examples as disclosed herein. The sidelink resource pool configuration component 725 may be configured as or otherwise support a means for receiving an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The SCI reception component 740 may be configured as or otherwise support a means for receiving, from the first UE in the control region of the slot, SCI that reserves a subslot of the set of contiguous subslots for a sidelink message to the second UE. The sidelink message component 735 may be configured as or otherwise support a means for receiving the sidelink message from the first UE at least partially in the subslot.

Figure 8:
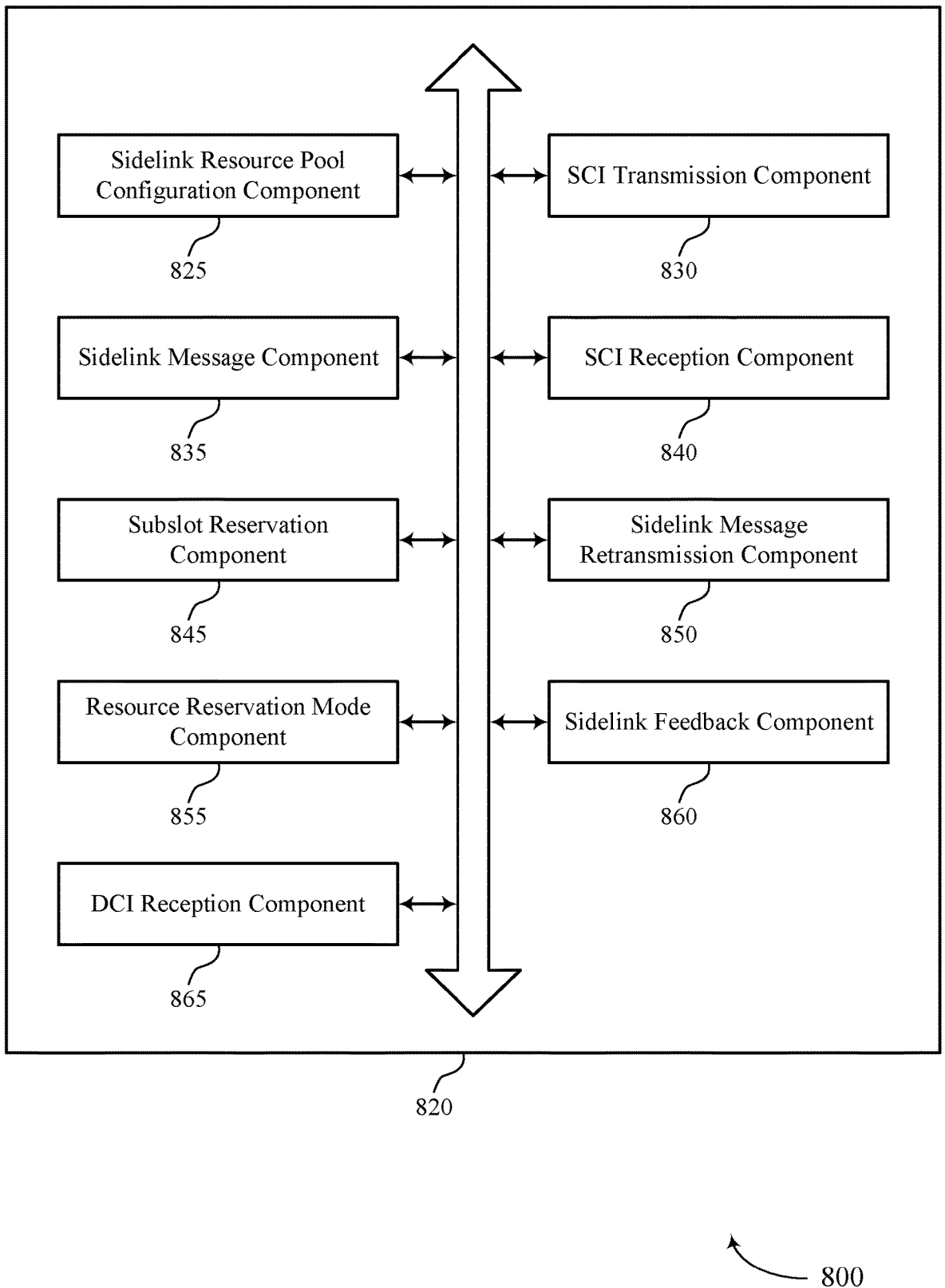
FIG. 8 shows a block diagram of a communications manager that supports slot format for low latency sidelink communications in accordance with aspects of the present disclosure.

FIG. 8 shows a block diagram 800 of a communications manager 820 that supports slot format for low latency sidelink communications in accordance with aspects of the present disclosure. The communications manager 820 may be an example of aspects of a communications manager 620, a communications manager 720, or both, as described herein. The communications manager 820, or various components thereof, may be an example of means for performing various aspects of slot format for low latency sidelink communications as described herein. For example, the communications manager 820 may include a sidelink resource pool configuration component 825, an SCI transmission component 830, a sidelink message component 835, an SCI reception component 840, a subslot reservation component 845, a sidelink message retransmission component 850, a resource reservation mode component 855, a sidelink feedback component 860, a DCI reception component 865, or any combination thereof. Each of these components may communicate, directly or indirectly, with one another (e.g., via one or more buses).

The communications manager 820 may support wireless communications by a first UE in accordance with examples as disclosed herein. The sidelink resource pool configuration component 825 may be configured as or otherwise support a means for receiving an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The SCI transmission component 830 may be configured as or otherwise support a means for transmitting, to a second UE of the group of UEs in the control region of the slot, SCI that reserves a subslot of the slot for a sidelink message to the second UE. The sidelink message component 835 may be configured as or otherwise support a means for transmitting at least a portion of the sidelink message to the second UE in the subslot.

In some examples, the subslot reservation component 845 may be configured as or otherwise support a means for reserving, via the SCI, a second subslot for a retransmission of the sidelink message, where the second subslot is within the slot or within a second set of contiguous subslots included in a second slot of the sidelink resource pool. In some examples, the sidelink message retransmission component 850 may be configured as or otherwise support a means for transmitting the retransmission of the sidelink message to the second UE in the second subslot.

In some examples, the sidelink feedback component 860 may be configured as or otherwise support a means for receiving, from the second UE in a third subslot subsequent to the subslot and prior to the second subslot, a sidelink feedback message corresponding to the sidelink message, where transmitting the retransmission of the sidelink message in the second subslot is based on receiving the sidelink feedback message.

In some examples, the SCI reserves a group of subslots within the set of contiguous subslots, the group of subslots including the subslot and one or more other subslots. In some examples, the sidelink message may include a transport block that spans the group of subslots. In some examples, the one or more other subslots may be contiguous with the subslot. In some examples, whether the one or more other subslots are contiguous with the subslot may be based at least in part on whether the first UE is capable of mapping the transport block to noncontiguous subslots.

In some examples, the resource reservation mode component 855 may be configured as or otherwise support a means for identifying a resource reservation mode for the SCI, the identified resource reservation mode one of a set of resource reservation modes including a first resource reservation mode that corresponds to reserving, from the set of contiguous subslots, a single subslot per transport block and a second resource reservation mode that corresponds to reserving, from the set of contiguous subslots, a group of subslots per transport block. In some examples, the SCI transmission component 830 may be configured as or otherwise support a means for configuring the SCI to reserve one or more subslots of the slot for the sidelink message in accordance with the identified resource reservation mode, the one or more subslots including the subslot.

In some examples, the indication of the configuration of the sidelink resource pool indicates a configured resource reservation mode for the sidelink resource pool. In some examples, identifying the resource reservation mode includes identifying the configured resource reservation mode.

In some examples, the DCI reception component 865 may be configured as or otherwise support a means for receiving, from a base station via DCI, an indication of the resource reservation mode, where identifying the resource reservation mode includes identifying the indicated resource reservation mode.

In some examples, the resource reservation mode component 855 may be configured as or otherwise support a means for selecting, by the first UE, the resource reservation mode from the set of resource reservation modes, where identifying the resource reservation mode includes selecting the resource reservation mode. In some examples, the resource reservation mode component 855 may be configured as or otherwise support a means for transmitting, to the second UE within the SCI, an indication of the identified resource reservation mode.

In some examples, a first symbol within the slot includes an AGC symbol, a last symbol within the slot includes a gap symbol, and remaining symbols within the slot are each allocated for the sidelink control channel or the sidelink data channel. In some examples, the sidelink data channel spans at least one subchannel within each symbol included in the set of contiguous subslots. In some examples, a second subslot is between the control region and the subslot.

In some examples, the SCI transmission component 830 may be configured as or otherwise support a means for reserving, via the SCI, a second subslot within a second slot subsequent to the slot for a second sidelink message to the second UE. In some examples, the sidelink message component 835 may be configured as or otherwise support a means for transmitting the second sidelink message to the second UE at least partially in the second subslot.

In some examples, each slot within each subchannel of the sidelink resource pool includes a respective control region allocated for the sidelink control channel and a respective set of contiguous subslots allocated for the sidelink data channel.

Additionally or alternatively, the communications manager 820 may support wireless communications at a second UE in accordance with examples as disclosed herein. In some examples, the sidelink resource pool configuration component 825 may be configured as or otherwise support a means for receiving an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The SCI reception component 840 may be configured as or otherwise support a means for receiving, from the first UE in the control region of the slot, SCI that reserves a subslot of the set of contiguous subslots for a sidelink message to the second UE. In some examples, the sidelink message component 835 may be configured as or otherwise support a means for receiving the sidelink message from the first UE at least partially in the subslot.

In some examples, the sidelink message retransmission component 850 may be configured as or otherwise support a means for receiving a retransmission of the sidelink message from the first UE in a second subslot, the second subslot within the slot or within a second set of contiguous subslots included in a second slot of the sidelink resource pool, where the SCI further reserves the second subslot for the retransmission of the sidelink message.

In some examples, the sidelink feedback component 860 may be configured as or otherwise support a means for transmitting, to the first UE in a third subslot subsequent to the subslot and prior to the second subslot, a sidelink feedback message corresponding to the sidelink message, where receiving the retransmission of the sidelink message in the second subslot may be based on transmitting the sidelink feedback message.

In some examples, the SCI reserves a group of subslots within the set of contiguous subslots, the group of subslots including the subslot and one or more other subslots. In some examples, the sidelink message includes a transport block that spans the group of subslots.

In some examples, the resource reservation mode component 855 may be configured as or otherwise support a means for identifying a resource reservation mode for the SCI, the resource reservation mode one of a set of resource reservation modes including a first resource reservation mode that corresponds to reserving, from the set of contiguous subslots, a single subslot per transport block and a second resource reservation mode that corresponds to reserving, from the set of contiguous subslots, a group of subslots per transport block. In some examples, the sidelink message component 835 may be configured as or otherwise support a means for decoding the sidelink message based on the resource reservation mode.

In some examples, the indication of the configuration of the sidelink resource pool indicates a configured resource reservation mode for the sidelink resource pool. In some examples, identifying the resource reservation mode includes identifying the configured resource reservation mode.

In some examples, the DCI reception component 865 may be configured as or otherwise support a means for receiving, from a base station via DCI, an indication of the resource reservation mode, where identifying the resource reservation mode includes identifying the indicated resource reservation mode.

In some examples, the SCI reception component 840 may be configured as or otherwise support a means for receiving, within the SCI, an indication of the resource reservation mode, where the identified resource reservation mode includes the indicated resource reservation mode.

In some examples, the sidelink message component 835 may be configured as or otherwise support a means for receiving a second sidelink message from the first UE at least partially in a second subslot within a second slot subsequent to the slot, where the SCI reserves the second subslot for the second sidelink message.

Figure 9:
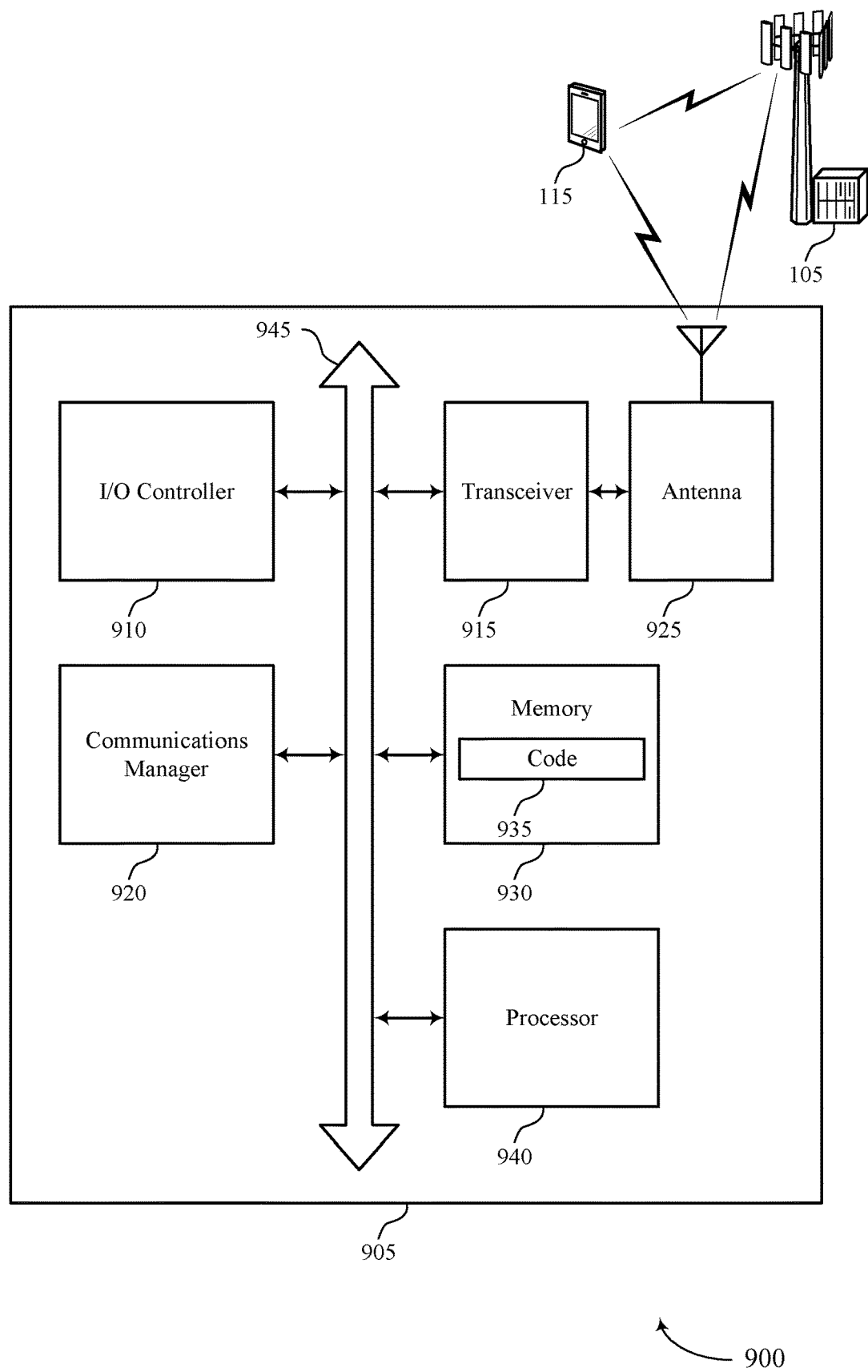
FIG. 9 shows a diagram of a system including a device that supports slot format for low latency sidelink communications in accordance with aspects of the present disclosure.

FIG. 9 shows a diagram of a system 900 including a device 905 that supports slot format for low latency sidelink communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting slot format for low latency sidelink communications). For example, the device 905 or a component of the device 905 may include a processor 940 and memory 930 coupled to the processor 940, the processor 940 and memory 930 configured to perform various functions described herein.

The communications manager 920 may support wireless communications by a first UE in accordance with examples as disclosed herein. For example, the communications manager 920 may be configured as or otherwise support a means for receiving an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The communications manager 920 may be configured as or otherwise support a means for transmitting, to a second UE of the group of UEs in the control region of the slot, SCI that reserves a subslot of the slot for a sidelink message to the second UE. The communications manager 920 may be configured as or otherwise support a means for transmitting at least a portion of the sidelink message to the second UE in the subslot.

Additionally or alternatively, the communications manager 920 may support wireless communications at a second UE in accordance with examples as disclosed herein. For example, the communications manager 920 may be configured as or otherwise support a means for receiving an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The communications manager 920 may be configured as or otherwise support a means for receiving, from the first UE in the control region of the slot, SCI that reserves a subslot of the set of contiguous subslots for a sidelink message to the second UE. The communications manager 920 may be configured as or otherwise support a means for receiving the sidelink message from the first UE at least partially in the subslot.

By including or configuring the communications manager 920 in accordance with examples as described herein, the device 905 may support techniques for improved communication reliability, reduced latency, more efficient utilization of communication resources, and improved spectral efficiency. By performing and scheduling sidelink communications according to a subslot granularity, as described herein, the device 905 (e.g., a UE 115) may reduce latency and improve reliability of sidelink communications. For example, the device 905 may refrain from switching between transmission and reception within a slot, determine an AGC setting for receiving sidelink data within each symbol of a slot based on decoding a first AGC symbol in the slot, or both. As such, each slot may include a single AGC symbol and a single gap symbol, which may provide for improved spectral efficiency and reduced latency. Additionally or alternatively, the device may schedule transmission of a sidelink message (e.g., a transport block) within a single subslot to reduce latency or schedule the sidelink message within a group of contiguous subslots, which may provide for improved coverage extension (e.g., relatively large data packet sizes may be supported).

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of slot format for low latency sidelink communications as described herein, or the processor 940 and the memory 930 may be otherwise configured to perform or support such operations.

Figure 10:
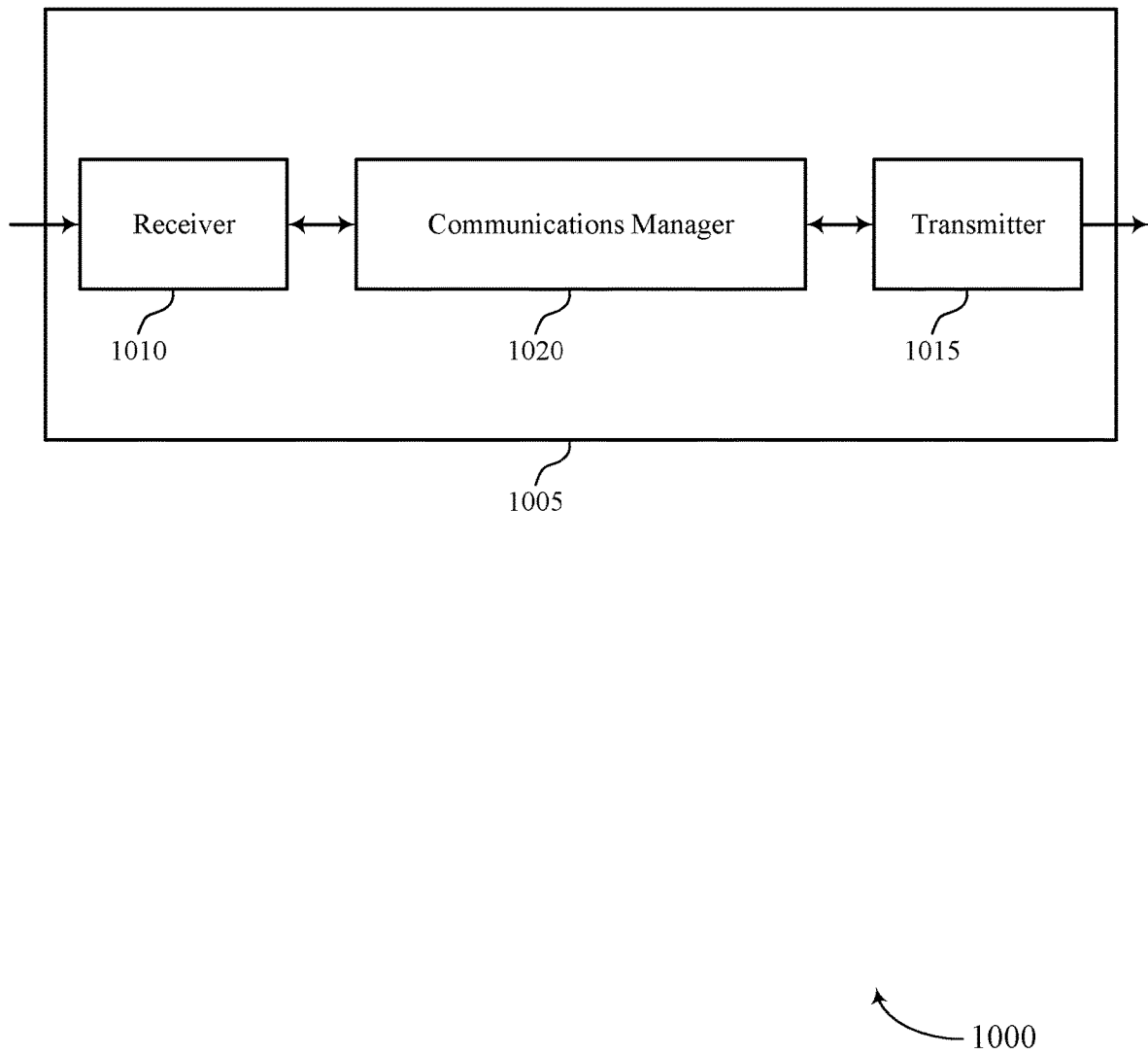
FIGS. 10 and 11 show block diagrams of devices that support slot format for low latency sidelink communications in accordance with aspects of the present disclosure.

FIG. 10 shows a block diagram 1000 of a device 1005 that supports slot format for low latency sidelink communications in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to slot format for low latency sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to slot format for low latency sidelink communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of slot format for low latency sidelink communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010. The communications manager 1020 may send information to the transmitter 1015. The communications manager 1020 may be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a group of UEs, an indication of a configuration of a sidelink resource pool for the group of UEs, where the sidelink resource pool includes one or more slots in a time domain and one or more subchannels in a frequency domain, and where a slot within a subchannel of the sidelink resource pool includes a control region allocated for a sidelink control channel and a set of contiguous subslots each allocated for a sidelink data channel. The communications manager 1020 may be configured as or otherwise support a means for identifying one or more subslots of the set of contiguous subslots that are available for sidelink communications. The communications manager 1020 may be configured as or otherwise support a means for transmitting, to a UE of the group of UEs, an indication that the one or more subslots are reserved for the sidelink communications.

Figure 11:
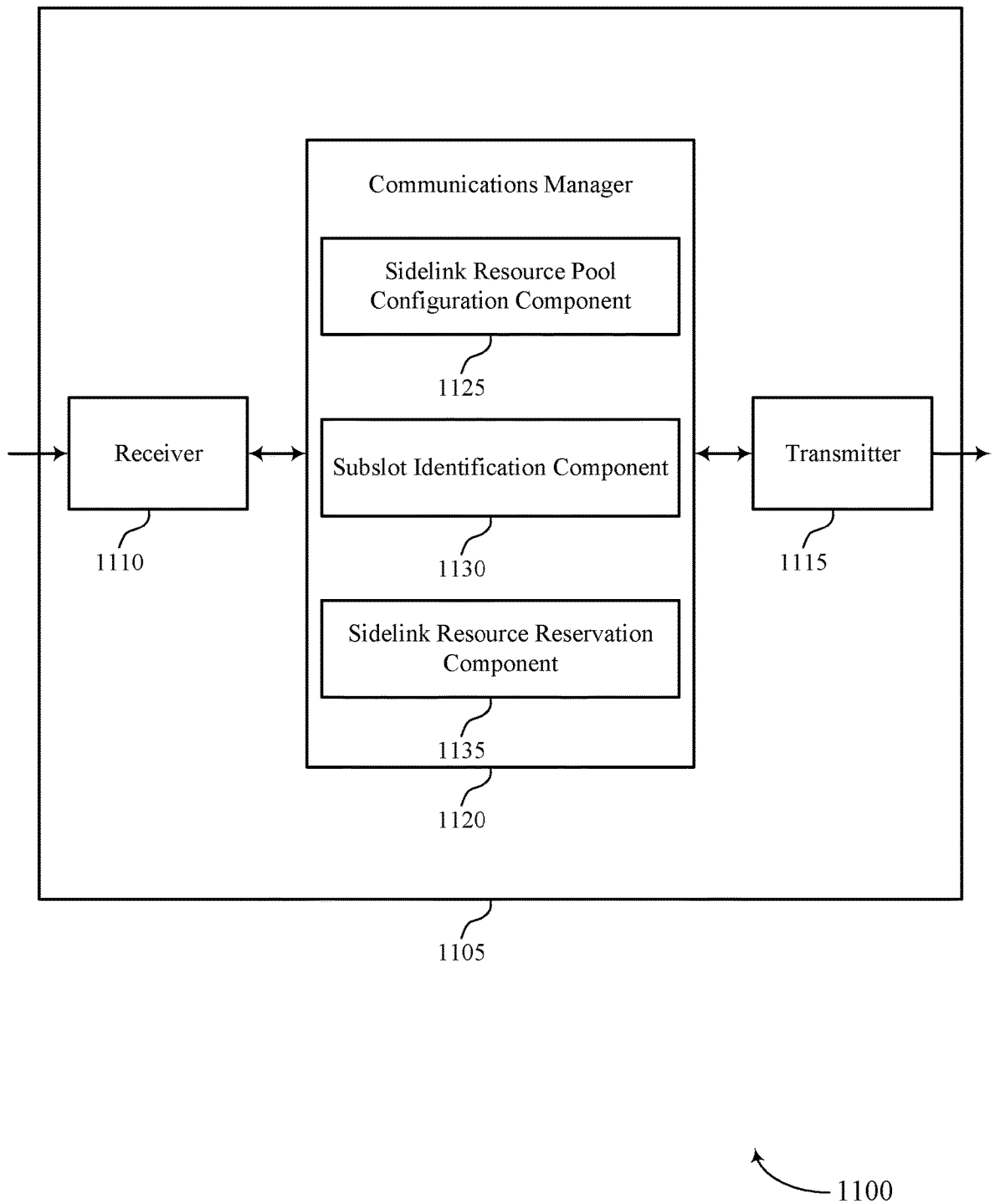

FIG. 11 shows a block diagram 1100 of a device 1105 that supports slot format for low latency sidelink communications in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to slot format for low latency sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to slot format for low latency sidelink communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of slot format for low latency sidelink communications as described herein. For example, the communications manager 1120 may include a sidelink resource pool configuration component 1125, a subslot identification component 1130, a sidelink resource reservation component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The sidelink resource pool configuration component 1125 may be configured as or otherwise support a means for transmitting, to a group of UEs, an indication of a configuration of a sidelink resource pool for the group of UEs, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The subslot identification component 1130 may be configured as or otherwise support a means for identifying one or more subslots of the set of contiguous subslots that are available for sidelink communications. The sidelink resource reservation component 1135 may be configured as or otherwise support a means for transmitting, to a UE of the group of UEs, an indication that the one or more subslots are reserved for the sidelink communications.

Figure 12:
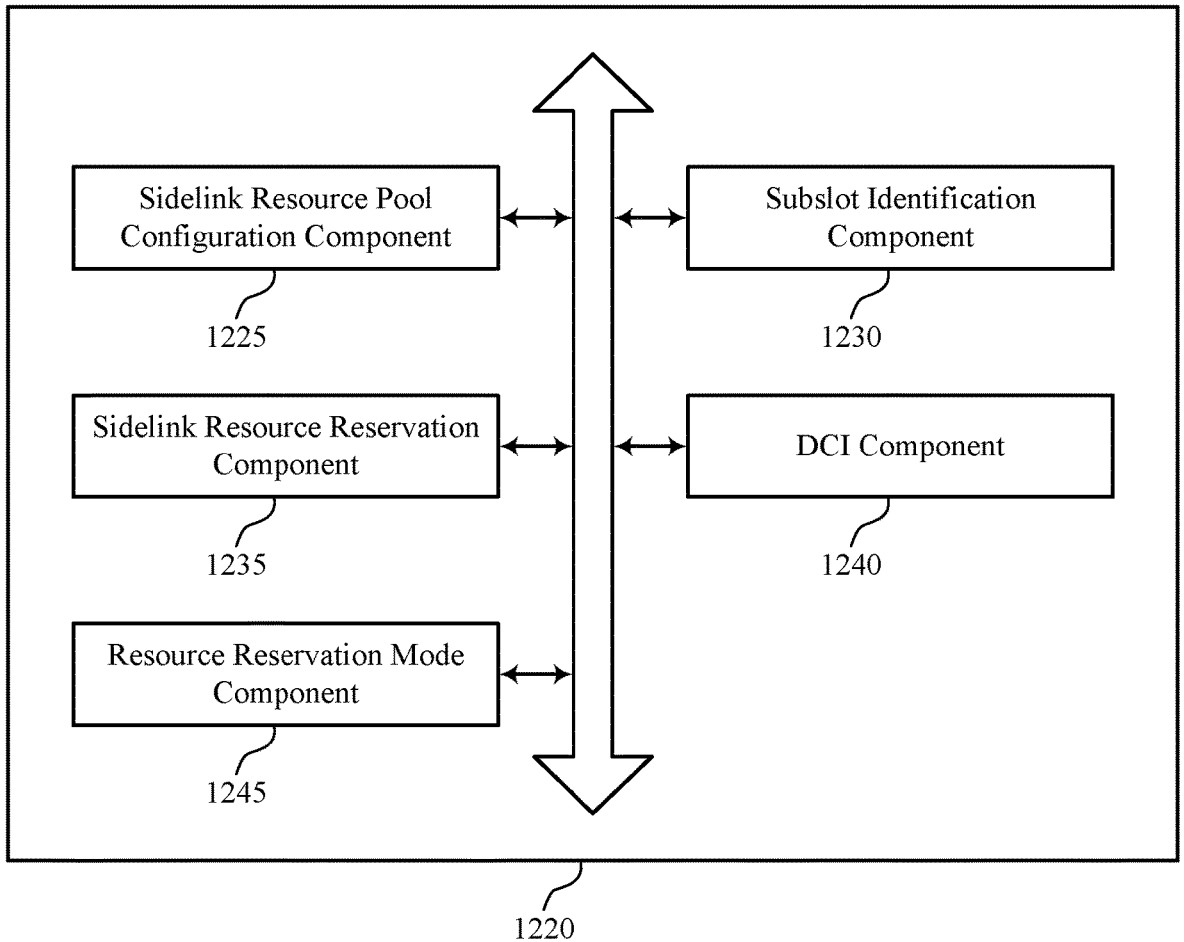
FIG. 12 shows a block diagram of a communications manager that supports slot format for low latency sidelink communications in accordance with aspects of the present disclosure.

FIG. 12 shows a block diagram 1200 of a communications manager 1220 that supports slot format for low latency sidelink communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of slot format for low latency sidelink communications as described herein. For example, the communications manager 1220 may include a sidelink resource pool configuration component 1225, a subslot identification component 1230, a sidelink resource reservation component 1235, a DCI component 1240, a resource reservation mode component 1245, or any combination thereof. Each of these components may communicate, directly or indirectly, with one another (e.g., via one or more buses).

The communications manager 1220 may support wireless communications at a base station in accordance with examples as disclosed herein. The sidelink resource pool configuration component 1225 may be configured as or otherwise support a means for transmitting, to a group of UEs, an indication of a configuration of a sidelink resource pool for the group of UEs, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The subslot identification component 1230 may be configured as or otherwise support a means for identifying one or more subslots of the set of contiguous subslots that are available for sidelink communications. The sidelink resource reservation component 1235 may be configured as or otherwise support a means for transmitting, to a UE of the group of UEs, an indication that the one or more subslots are reserved for the sidelink communications.

In some examples, to support transmitting the indication that the one or more subslots are reserved for the sidelink communications, the DCI component 1240 may be configured as or otherwise support a means for transmitting DCI to the UE, where the DCI reserves the one or more subslots for transmission of a sidelink message from the UE to a second UE of the group of UEs.

In some examples, the indication that the one or more subslots are reserved for the sidelink communications allocates sidelink resources within the sidelink resource pool to the UE for sidelink transmissions by the UE, the allocated sidelink resources including the one or more subslots and at least one subslot within a second slot of the sidelink resource pool.

In some examples, the resource reservation mode component 1245 may be configured as or otherwise support a means for selecting a resource reservation mode for a sidelink communication by the UE, the selected resource reservation mode one of a set of resource reservation modes including a first resource reservation mode that corresponds to reserving, from the set of contiguous subslots, a single subslot per transport block and a second resource reservation mode that corresponds to reserving, from the set of contiguous subslots, a group of subslots per transport block. In some examples, the resource reservation mode component 1245 may be configured as or otherwise support a means for indicating the selected resource reservation mode to the UE via the indication of the configuration of the sidelink resource pool or via DCI.

Figure 13:
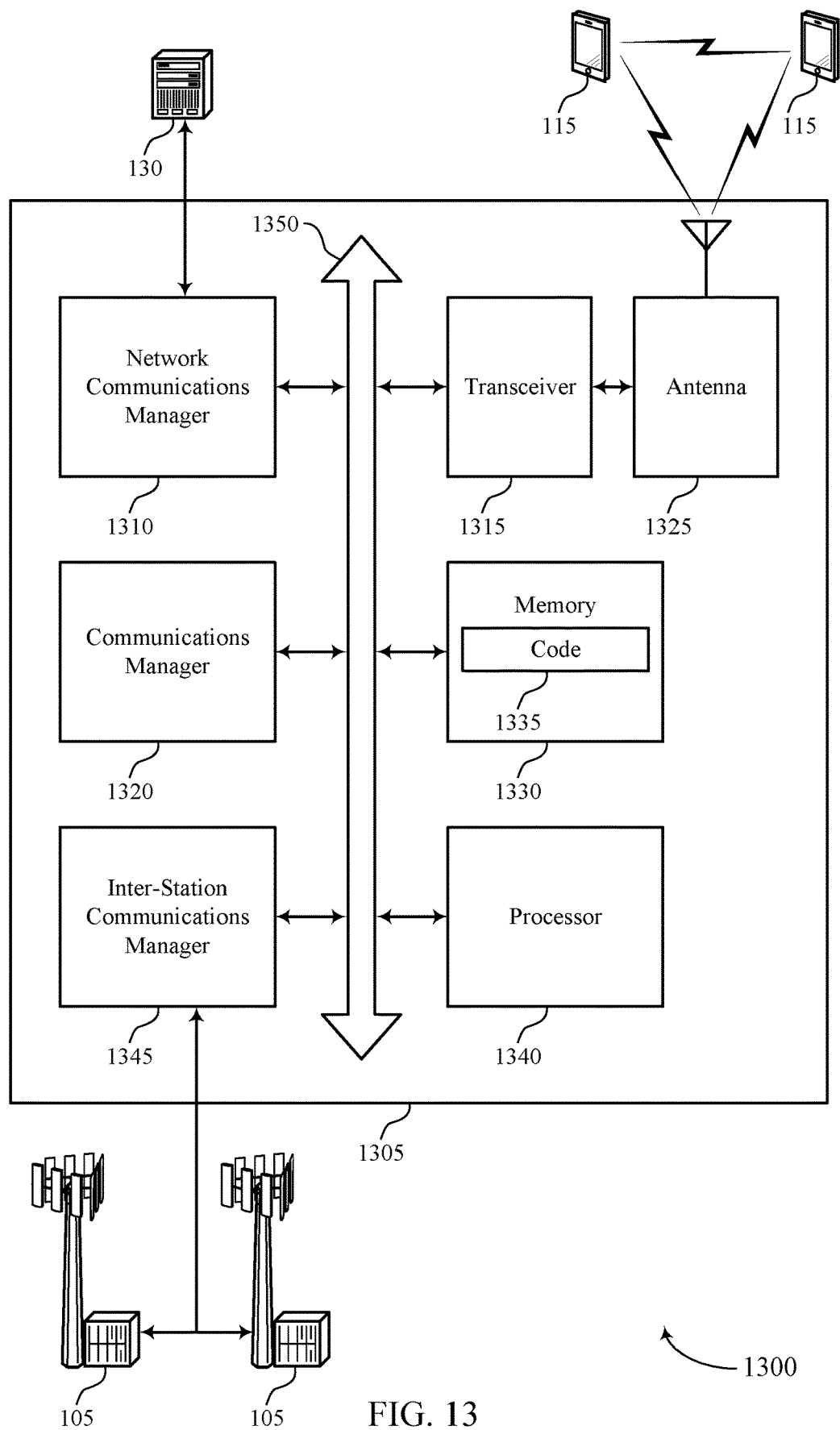
FIG. 13 shows a diagram of a system including a device that supports slot format for low latency sidelink communications in accordance with aspects of the present disclosure.

FIG. 13 shows a diagram of a system 1300 including a device 1305 that supports slot format for low latency sidelink communications in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting slot format for low latency sidelink communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a group of UEs, an indication of a configuration of a sidelink resource pool for the group of UEs, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The communications manager 1320 may be configured as or otherwise support a means for identifying one or more subslots of the set of contiguous subslots that are available for sidelink communications. The communications manager 1320 may be configured as or otherwise support a means for transmitting, to a UE of the group of UEs, an indication that the one or more subslots are reserved for the sidelink communications.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of slot format for low latency sidelink communications as described herein, or the processor 1340 and the memory 1330 may be otherwise configured to perform or support such operations.

Figure 14:
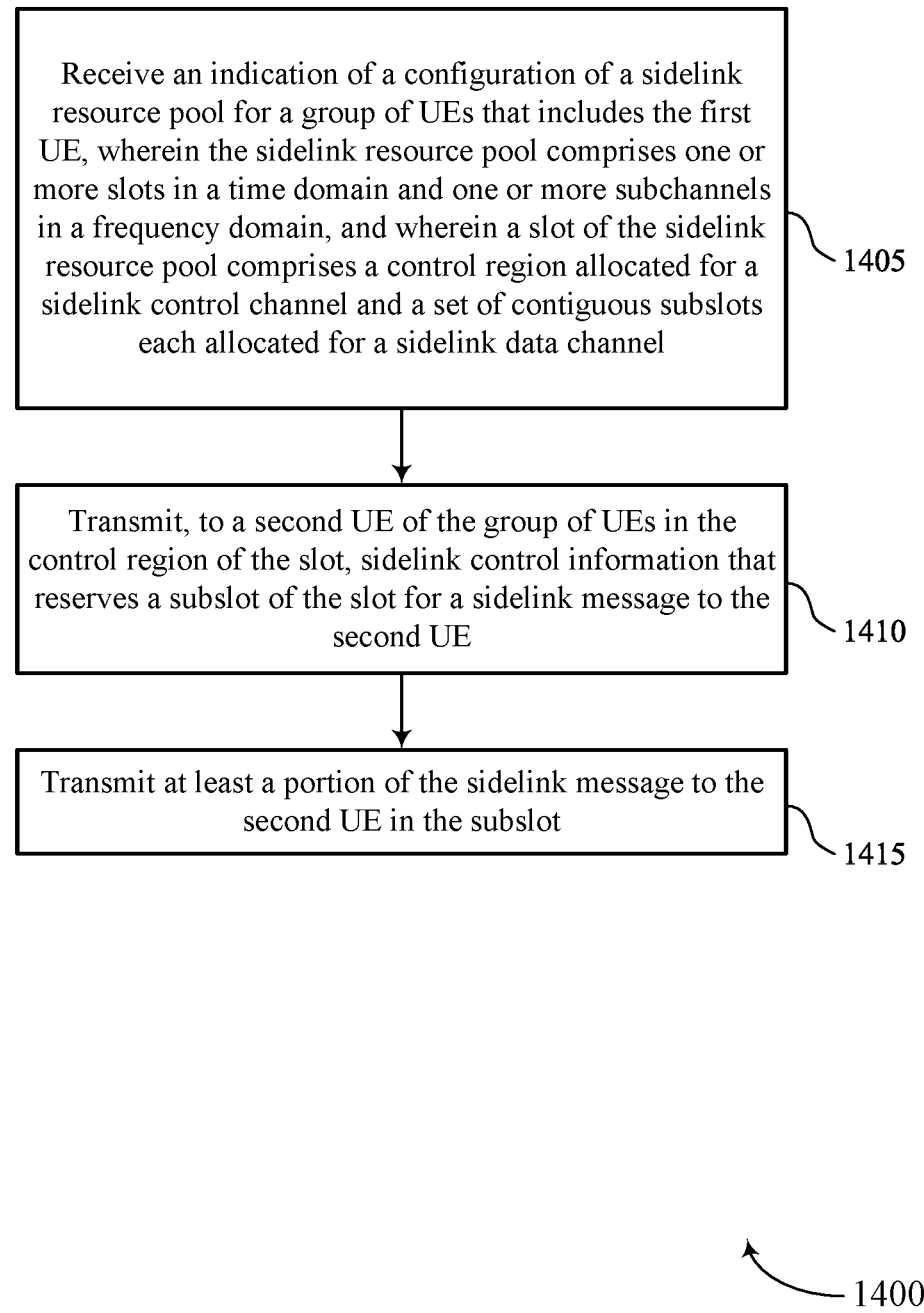
FIGS. 14 through 17 show flowcharts illustrating methods that support slot format for low latency sidelink communications in accordance with aspects of the present disclosure.

FIG. 14 shows a flowchart illustrating a method 1400 that supports slot format for low latency sidelink communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The operations of 1405 may be performed in accordance with examples as disclosed herein. In some examples, aspects of the operations of 1405 may be performed by a sidelink resource pool configuration component 825 as described with reference to FIG. 8.

At 1410, the method may include transmitting, to a second UE of the group of UEs in the control region of the slot, SCI that reserves a subslot of the slot for a sidelink message to the second UE. The operations of 1410 may be performed in accordance with examples as disclosed herein. In some examples, aspects of the operations of 1410 may be performed by an SCI transmission component 830 as described with reference to FIG. 8.

At 1415, the method may include transmitting at least a portion of the sidelink message to the second UE in the subslot. The operations of 1415 may be performed in accordance with examples as disclosed herein. In some examples, aspects of the operations of 1415 may be performed by a sidelink message component 835 as described with reference to FIG. 8.

Figure 15:
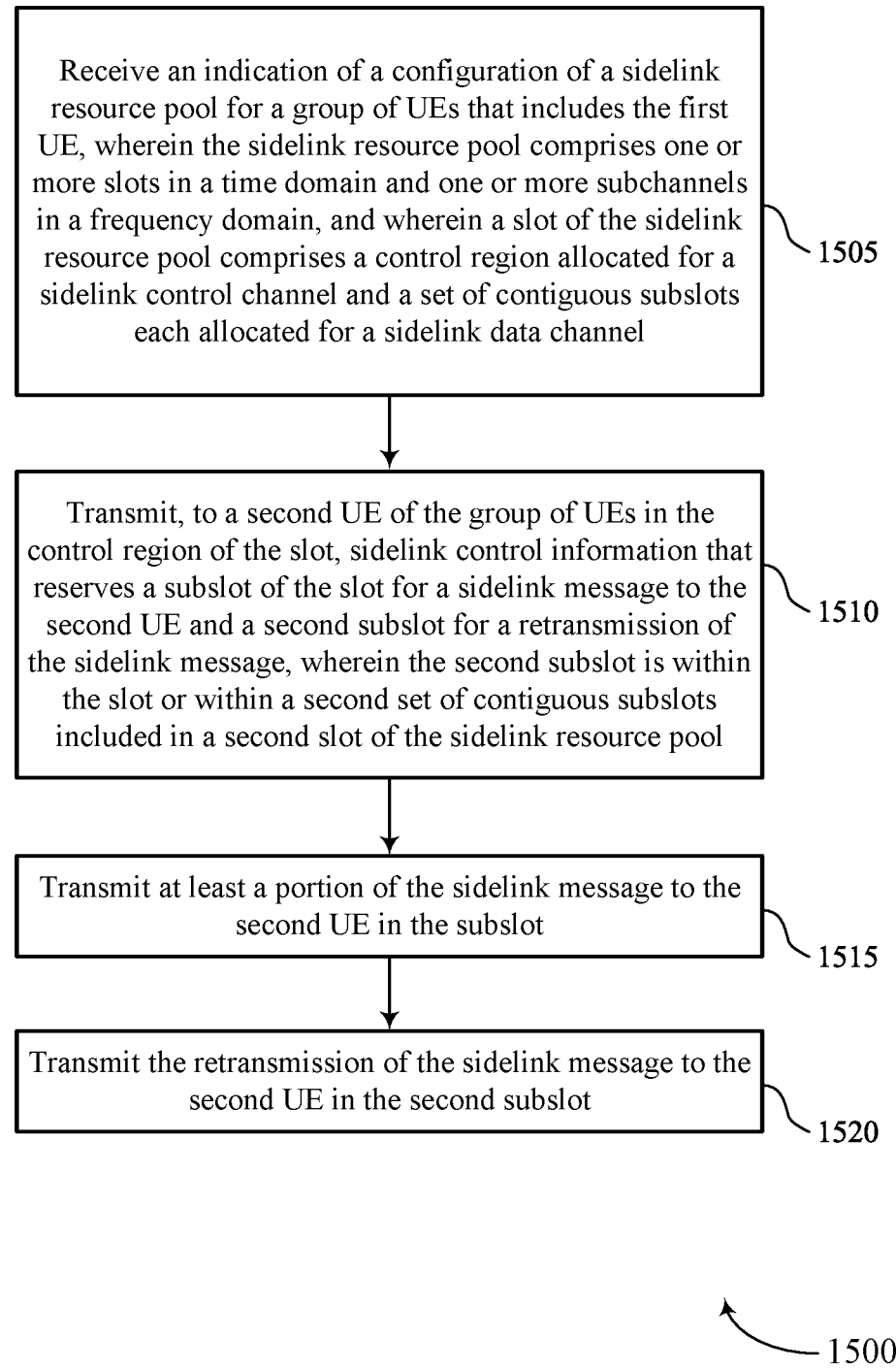

FIG. 15 shows a flowchart illustrating a method 1500 that supports slot format for low latency sidelink communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving an indication of a configuration of a sidelink resource pool for a group of UEs that includes the first UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The operations of 1505 may be performed in accordance with examples as disclosed herein. In some examples, aspects of the operations of 1505 may be performed by a sidelink resource pool configuration component 825 as described with reference to FIG. 8.

At 1510, the method may include transmitting, to a second UE of the group of UEs in the control region of the slot, SCI that reserves a subslot of the slot for a sidelink message to the second UE and a second subslot for a retransmission of the sidelink message, where the second subslot is within the slot or within a second set of contiguous subslots included in a second slot of the sidelink resource pool. The operations of 1510 may be performed in accordance with examples as disclosed herein. In some examples, aspects of the operations of 1510 may be performed by an SCI transmission component 830 or a subslot reservation component 845 as described with reference to FIG. 8.

At 1515, the method may include transmitting at least a portion of the sidelink message to the second UE in the subslot. The operations of 1515 may be performed in accordance with examples as disclosed herein. In some examples, aspects of the operations of 1515 may be performed by a sidelink message component 835 as described with reference to FIG. 8.

At 1520, the method may include transmitting the retransmission of the sidelink message to the second UE in the second subslot. The operations of 1520 may be performed in accordance with examples as disclosed herein. In some examples, aspects of the operations of 1520 may be performed by a sidelink message retransmission component 850 as described with reference to FIG. 8.

Figure 16:
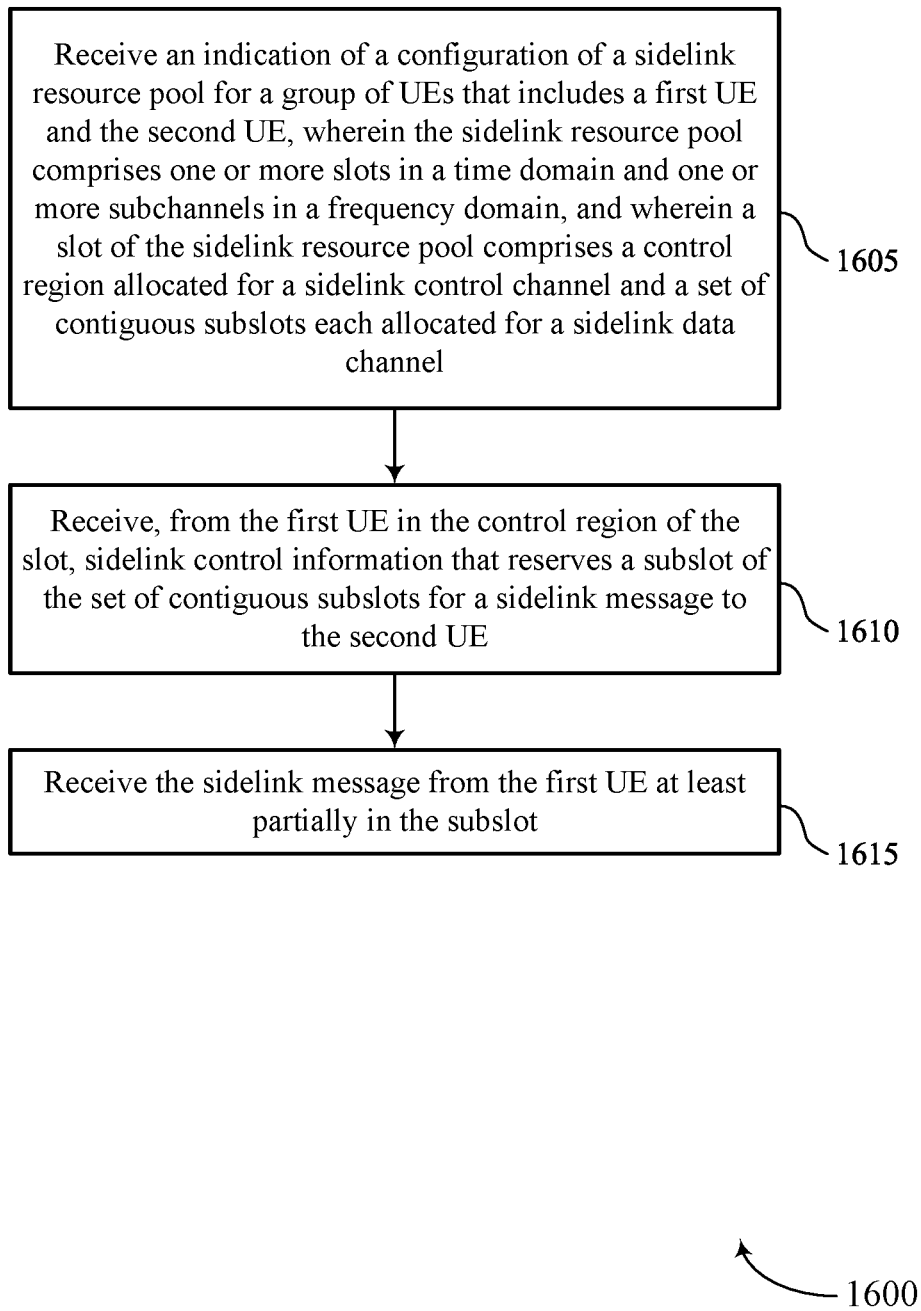

FIG. 16 shows a flowchart illustrating a method 1600 that supports slot format for low latency sidelink communications in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving an indication of a configuration of a sidelink resource pool for a group of UEs that includes a first UE and the second UE, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The operations of 1605 may be performed in accordance with examples as disclosed herein. In some examples, aspects of the operations of 1605 may be performed by a sidelink resource pool configuration component 825 as described with reference to FIG. 8.

At 1610, the method may include receiving, from the first UE in the control region of the slot, SCI that reserves a subslot of the set of contiguous subslots for a sidelink message to the second UE. The operations of 1610 may be performed in accordance with examples as disclosed herein. In some examples, aspects of the operations of 1610 may be performed by an SCI reception component 840 as described with reference to FIG. 8.

At 1615, the method may include receiving the sidelink message from the first UE at least partially in the subslot. The operations of 1615 may be performed in accordance with examples as disclosed herein. In some examples, aspects of the operations of 1615 may be performed by a sidelink message component 835 as described with reference to FIG. 8.

Figure 17:
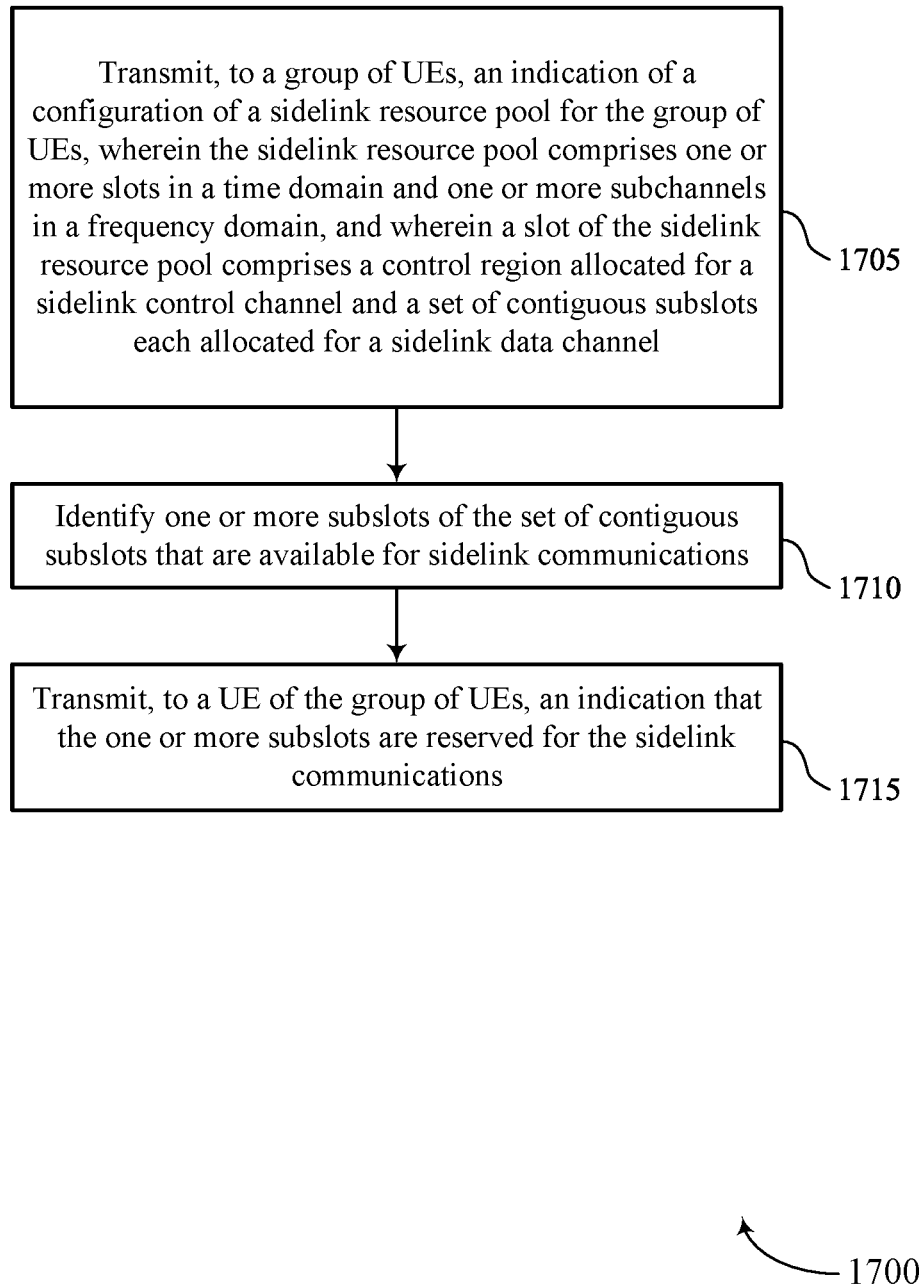

FIG. 17 shows a flowchart illustrating a method 1700 that supports slot format for low latency sidelink communications in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a group of UEs, an indication of a configuration of a sidelink resource pool for the group of UEs, where the sidelink resource pool includes one or more slots in a time domain and one or more subchannels in a frequency domain, and where a slot of the sidelink resource pool includes a control region allocated for a sidelink control channel and a set of contiguous subslots each allocated for a sidelink data channel. The operations of 1705 may be performed in accordance with examples as disclosed herein. In some examples, aspects of the operations of 1705 may be performed by a sidelink resource pool configuration component 1225 as described with reference to FIG. 12.

At 1710, the method may include identifying one or more subslots of the set of contiguous subslots that are available for sidelink communications. The operations of 1710 may be performed in accordance with examples as disclosed herein. In some examples, aspects of the operations of 1710 may be performed by a subslot identification component 1230 as described with reference to FIG. 12.

At 1715, the method may include transmitting, to a UE of the group of UEs, an indication that the one or more subslots are reserved for the sidelink communications. The operations of 1715 may be performed in accordance with examples as disclosed herein. In some examples, aspects of the operations of 1715 may be performed by a sidelink resource reservation component 1235 as described with reference to FIG. 12.

SUMMARY OF ASPECTS

The following provides an overview of aspects of the present disclosure:

Aspect 1: A method for wireless communications by a first user equipment (UE), comprising: receiving an indication of a configuration of a sidelink resource pool for a group of UEs that includes the first UE, wherein the sidelink resource pool comprises one or more slots in a time domain and one or more subchannels in a frequency domain, and wherein a slot of the sidelink resource pool comprises a control region allocated for a sidelink control channel and a set of contiguous subslots each allocated for a sidelink data channel; transmitting, to a second UE of the group of UEs in the control region of the slot, sidelink control information (SCI) that reserves a subslot of the slot for a sidelink message to the second UE; and transmitting at least a portion of the sidelink message to the second UE in the subslot.

Aspect 2: The method of aspect 1, further comprising: reserving, via the SCI, a second subslot for a retransmission of the sidelink message, wherein the second subslot is within the slot or within a second set of contiguous subslots included in a second slot of the sidelink resource pool; and transmitting the retransmission of the sidelink message to the second UE in the second subslot.

Aspect 3: The method of aspect 2, further comprising: receiving, from the second UE in a third subslot subsequent to the subslot and prior to the second subslot, a sidelink feedback message corresponding to the sidelink message, wherein transmitting the retransmission of the sidelink message in the second subslot is based at least in part on receiving the sidelink feedback message.

Aspect 4: The method of aspect 1, wherein: the SCI reserves a group of subslots within the set of contiguous subslots, the group of subslots comprising the sub slot and one or more other subslots; and the sidelink message comprises a transport block that spans the group of subslots.

Aspect 5: The method of aspect 4, wherein the one or more other subslots are contiguous with the subslot.

Aspect 6: The method of any of aspects 4 through 5, wherein whether the one or more other subslots are contiguous with the subslot is based at least in part on whether the first UE is capable of mapping the transport block to noncontiguous subslots.

Aspect 7: The method of any of aspects 1 through 4, further comprising: identifying a resource reservation mode for the SCI, the identified resource reservation mode one of a set of resource reservation modes comprising: a first resource reservation mode that corresponds to reserving, from the set of contiguous subslots, a single subslot per transport block; and a second resource reservation mode that corresponds to reserving, from the set of contiguous subslots, a group of subslots per transport block; and configuring the SCI to reserve one or more subslots of the slot for the sidelink message in accordance with the identified resource reservation mode, the one or more subslots comprising the subslot.

Aspect 8: The method of aspect 7, wherein: the indication of the configuration of the sidelink resource pool indicates a configured resource reservation mode for the sidelink resource pool; and identifying the resource reservation mode comprises identifying the configured resource reservation mode.

Aspect 9: The method of aspect 7, further comprising: receiving, from a base station via downlink control information (DCI), an indication of the resource reservation mode, wherein identifying the resource reservation mode comprises identifying the indicated resource reservation mode.

Aspect 10: The method of aspect 7, further comprising: selecting, by the first UE, the resource reservation mode from the set of resource reservation modes, wherein identifying the resource reservation mode comprises selecting the resource reservation mode; and transmitting, to the second UE within the SCI, an indication of the identified resource reservation mode.

Aspect 11: The method of any of aspects 1 through 10, wherein a first symbol within the slot comprises an automatic gain control (AGC) symbol, a last symbol within the slot comprises a gap symbol, and remaining symbols within the slot are each allocated for the sidelink control channel or the sidelink data channel.

Aspect 12: The method of any of aspects 1 through 11, wherein the sidelink data channel spans at least one subchannel within each symbol included in the set of contiguous subslots.

Aspect 13: The method of any of aspects 1 through 12, wherein a second subslot is between the control region and the subslot.

Aspect 14: The method of any of aspects 1 through 13, further comprising: reserving, via the SCI, a second subslot within a second slot subsequent to the slot for a second sidelink message to the second UE; and transmitting the second sidelink message to the second UE at least partially in the second subslot.

Aspect 15: The method of any of aspects 1 through 14, wherein each slot within each subchannel of the sidelink resource pool comprises a respective control region allocated for the sidelink control channel and a respective set of contiguous subslots allocated for the sidelink data channel.

Aspect 16: A method for wireless communications at a second UE, comprising: receiving an indication of a configuration of a sidelink resource pool for a group of UEs that includes a first UE and the second UE, wherein the sidelink resource pool comprises one or more slots in a time domain and one or more subchannels in a frequency domain, and wherein a slot of the sidelink resource pool comprises a control region allocated for a sidelink control channel and a set of contiguous subslots each allocated for a sidelink data channel; receiving, from the first UE in the control region of the slot, SCI that reserves a subslot of the set of contiguous subslots for a sidelink message to the second UE; and receiving the sidelink message from the first UE at least partially in the subslot.

Aspect 17: The method of aspect 16, further comprising: receiving a retransmission of the sidelink message from the first UE in a second subslot, the second subslot within the slot or within a second set of contiguous subslots included in a second slot of the sidelink resource pool, wherein the SCI further reserves the second subslot for the retransmission of the sidelink message.

Aspect 18: The method of aspect 17, further comprising: transmitting, to the first UE in a third subslot subsequent to the subslot and prior to the second subslot, a sidelink feedback message corresponding to the sidelink message, wherein receiving the retransmission of the sidelink message in the second subslot based at least in part on transmitting the sidelink feedback message.

Aspect 19: The method of aspect 16, wherein: the SCI reserves a group of subslots within the set of contiguous subslots, the group of subslots comprising the sub slot and one or more other subslots; and the sidelink message comprises a transport block that spans the group of subslots.

Aspect 20: The method of any of aspects 16 through 19, further comprising: identifying a resource reservation mode for the SCI, the resource reservation mode one of a set of resource reservation modes comprising: a first resource reservation mode that corresponds to reserving, from the set of contiguous subslots, a single subslot per transport block; and a second resource reservation mode that corresponds to reserving, from the set of contiguous subslots, a group of subslots per transport block; and decoding the sidelink message based at least in part on the resource reservation mode.

Aspect 21: The method of aspect 20, wherein: the indication of the configuration of the sidelink resource pool indicates a configured resource reservation mode for the sidelink resource pool; and identifying the resource reservation mode comprises identifying the configured resource reservation mode.

Aspect 22: The method of aspect 20, further comprising: receiving, from a base station via DCI, an indication of the resource reservation mode, wherein identifying the resource reservation mode comprises identifying the indicated resource reservation mode.

Aspect 23: The method of aspect 20, further comprising: receiving, within the SCI, an indication of the resource reservation mode, wherein the identified resource reservation mode comprises the indicated resource reservation mode.

Aspect 24: The method of any of aspects 16 through 23, further comprising: receiving a second sidelink message from the first UE at least partially in a second subslot within a second slot subsequent to the slot, wherein the SCI reserves the second subslot for the second sidelink message.

Aspect 25: A method for wireless communications at a base station, comprising: transmitting, to a group of UEs, an indication of a configuration of a sidelink resource pool for the group of UEs, wherein the sidelink resource pool comprises one or more slots in a time domain and one or more subchannels in a frequency domain, and wherein a slot of the sidelink resource pool comprises a control region allocated for a sidelink control channel and a set of contiguous subslots each allocated for a sidelink data channel; identifying one or more subslots of the set of contiguous subslots that are available for sidelink communications; and transmitting, to a UE of the group of UEs, an indication that the one or more subslots are reserved for the sidelink communications.

Aspect 26: The method of aspect 25, wherein transmitting the indication that the one or more subslots are reserved for the sidelink communications comprises: transmitting DCI to the UE, wherein the DCI reserves the one or more subslots for transmission of a sidelink message from the UE to a second UE of the group of UEs.

Aspect 27: The method of aspect 25, wherein the indication that the one or more subslots are reserved for the sidelink communications allocates sidelink resources within the sidelink resource pool to the UE for sidelink transmissions by the UE, the allocated sidelink resources comprising the one or more subslots and at least one subslot within a second slot of the sidelink resource pool.

Aspect 28: The method of any of aspects 25 through 27, further comprising: selecting a resource reservation mode for a sidelink communication by the UE, the selected resource reservation mode one of a set of resource reservation modes comprising: a first resource reservation mode that corresponds to reserving, from the set of contiguous subslots, a single subslot per transport block; and a second resource reservation mode that corresponds to reserving, from the set of contiguous subslots, a group of subslots per transport block; and indicating the selected resource reservation mode to the UE via the indication of the configuration of the sidelink resource pool or via DCI.

Aspect 29: An apparatus for wireless communications by a first UE, comprising a processor; memory coupled with the processor; and instructions stored in the memory and executable by the processor to cause the apparatus to perform a method of any of aspects 1 through 15.

Aspect 30: An apparatus for wireless communications by a first UE, comprising at least one means for performing a method of any of aspects 1 through 15.

Aspect 31: A non-transitory computer-readable medium storing code for wireless communications by a first UE, the code comprising instructions executable by a processor to perform a method of any of aspects 1 through 15.

Aspect 32: An apparatus for wireless communications at a second UE, comprising a processor; memory coupled with the processor; and instructions stored in the memory and executable by the processor to cause the apparatus to perform a method of any of aspects 16 through 24.

Aspect 33: An apparatus for wireless communications at a second UE, comprising at least one means for performing a method of any of aspects 16 through 24.

Aspect 34: A non-transitory computer-readable medium storing code for wireless communications at a second UE, the code comprising instructions executable by a processor to perform a method of any of aspects 16 through 24.

Aspect 35: An apparatus for wireless communications at a base station, comprising a processor; memory coupled with the processor; and instructions stored in the memory and executable by the processor to cause the apparatus to perform a method of any of aspects 25 through 28.

Aspect 36: An apparatus for wireless communications at a base station, comprising at least one means for performing a method of any of aspects 25 through 28.

Aspect 38: A non-transitory computer-readable medium storing code for wireless communications at a base station, the code comprising instructions executable by a processor to perform a method of any of aspects 25 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a first user equipment (UE), comprising:
   receiving, by the first UE, a first indication of a configuration of a sidelink resource pool for a group of UEs that includes the first UE, wherein the sidelink resource pool comprises one or more slots in a time domain and one or more subchannels in a frequency domain, and wherein a slot of the sidelink resource pool comprises a control region allocated for a sidelink control channel and a set of contiguous subslots each allocated for a sidelink data channel;

receiving, by the first UE, a second indication for the sidelink resource pool of a subslot pattern for the slot of the sidelink resource pool, the subslot pattern indicating a quantity of subslots within the slot and a length of each subslot of the quantity of subslots;

transmitting, by the first UE to a second UE of the group of UEs in the control region of the slot, sidelink control information that reserves a subslot from the subslot pattern for the slot for a transmission of a sidelink message to the second UE; and transmitting, by the first UE, at least a portion of the sidelink message to the second UE in the subslot.

2. The method of claim 1, further comprising:
reserving, via the sidelink control information, a second subslot for a retransmission of the sidelink message, wherein the second subslot is within the slot or within a second set of contiguous subslots included in a second slot of the sidelink resource pool; and
transmitting the retransmission of the sidelink message to the second UE in the second subslot.

3. The method of claim 2, further comprising:
receiving, from the second UE in a third subslot subsequent to the subslot and prior to the second subslot, a sidelink feedback message corresponding to the sidelink message, wherein transmitting the retransmission of the sidelink message in the second subslot is based at least in part on receiving the sidelink feedback message.

4. The method of claim 1, wherein:
the sidelink control information reserves a group of subslots within the set of contiguous subslots, the group of subslots comprising the subslot and one or more other subslots; and
the sidelink message comprises a transport block that spans the group of subslots.

5. The method of claim 4, wherein the one or more other subslots are contiguous with the subslot.

6. The method of claim 4, wherein whether the one or more other subslots are contiguous with the subslot is based at least in part on whether the first UE is capable of mapping the transport block to noncontiguous subslots.

7. The method of claim 1, further comprising:
identifying a resource reservation mode for the sidelink control information, wherein the identified resource reservation mode is one of a set of resource reservation modes comprising:
a first resource reservation mode that corresponds to reserving, from the set of contiguous subslots, a single subslot per transport block; and
a second resource reservation mode that corresponds to reserving, from the set of contiguous subslots, a group of subslots per transport block; and
configuring the sidelink control information to reserve one or more subslots of the slot for the sidelink message in accordance with the identified resource reservation mode, the one or more subslots comprising the subslot.

8. The method of claim 7, wherein:
the first indication of the configuration of the sidelink resource pool indicates a configured resource reservation mode for the sidelink resource pool; and
identifying the resource reservation mode comprises identifying the configured resource reservation mode.

9. The method of claim 7, further comprising:
receiving, from a network entity via downlink control information, an indication of the resource reservation mode, wherein identifying the resource reservation mode comprises identifying the indicated resource reservation mode.

10. The method of claim 7, further comprising:
selecting, by the first UE, the resource reservation mode from the set of resource reservation modes, wherein identifying the resource reservation mode comprises selecting the resource reservation mode; and
transmitting, to the second UE within the sidelink control information, an indication of the identified resource reservation mode.

11. The method of claim 1, wherein a first symbol within the slot comprises an automatic gain control symbol, a last symbol within the slot comprises a gap symbol, and remaining symbols within the slot are each allocated for the sidelink control channel or the sidelink data channel.

12. The method of claim 1, wherein the sidelink data channel spans at least one subchannel within each symbol included in the set of contiguous subslots.

13. The method of claim 1, wherein a second subslot is between the control region and the subslot.

14. The method of claim 1, further comprising:
reserving, via the sidelink control information, a second subslot within a second slot subsequent to the slot for a second sidelink message to the second UE; and
transmitting the second sidelink message to the second UE at least partially in the second subslot.

15. A method for wireless communications at a second user equipment (UE), comprising:
receiving, by the second UE, a first indication of a configuration of a sidelink resource pool for a group of UEs that includes a first UE and the second UE, wherein the sidelink resource pool comprises one or more slots in a time domain and one or more subchannels in a frequency domain, and wherein a slot of the sidelink resource pool comprises a control region allocated for a sidelink control channel and a set of contiguous subslots each allocated for a sidelink data channel;

receiving, by the second UE, a second indication for the sidelink resource pool of a subslot pattern for the slot of the sidelink resource pool, the subslot pattern indicating a quantity of subslots within the slot and a length of each subslot of the quantity of subslots;

receiving, by the second UE from the first UE in the control region of the slot, sidelink control information that reserves a subslot from the subslot pattern for the slot for receiving a transmission of a sidelink message to the second UE; and receiving, by the second UE, the sidelink message from the first UE at least partially in the subslot.

16. The method of claim 15, further comprising:
receiving a retransmission of the sidelink message from the first UE in a second subslot, the second subslot within the slot or within a second set of contiguous subslots included in a second slot of the sidelink resource pool, wherein the sidelink control information further reserves the second subslot for the retransmission of the sidelink message.

17. The method of claim 16, further comprising:
transmitting, to the first UE in a third subslot subsequent to the subslot and prior to the second subslot, a sidelink feedback message corresponding to the sidelink message, wherein receiving the retransmission of the sidelink message in the second subslot is based at least in part on transmitting the sidelink feedback message.

18. The method of claim 15, wherein:
the sidelink control information reserves a group of subslots within the set of contiguous subslots, the group of subslots comprising the subslot and one or more other subslots; and
the sidelink message comprises a transport block that spans the group of subslots.

19. The method of claim 15, further comprising:
identifying a resource reservation mode for the sidelink control information, wherein the resource reservation mode is one of a set of resource reservation modes comprising:
a first resource reservation mode that corresponds to reserving, from the set of contiguous subslots, a single subslot per transport block; and
a second resource reservation mode that corresponds to reserving, from the set of contiguous subslots, a group of subslots per transport block; and
decoding the sidelink message based at least in part on the resource reservation mode.

20. The method of claim 19, wherein:
the first indication of the configuration of the sidelink resource pool indicates a configured resource reservation mode for the sidelink resource pool; and
identifying the resource reservation mode comprises identifying the configured resource reservation mode.

21. The method of claim 19, further comprising:
receiving, from a network entity via downlink control information, an indication of the resource reservation mode, wherein identifying the resource reservation mode comprises identifying the indicated resource reservation mode.

22. The method of claim 19, further comprising:
receiving, within the sidelink control information, an indication of the resource reservation mode, wherein the identified resource reservation mode comprises the indicated resource reservation mode.

23. A method for wireless communications at a network entity, comprising:
transmitting, by the network entity to a group of user equipments (UEs), a first indication of a configuration of a sidelink resource pool for the group of UEs, wherein the sidelink resource pool comprises one or more slots in a time domain and one or more subchannels in a frequency domain, and wherein a slot of the sidelink resource pool comprises a control region allocated for a sidelink control channel and a set of contiguous subslots each allocated for a sidelink data channel;
transmitting, by the network entity, a second indication for the sidelink resource pool of a subslot pattern for the slot of the sidelink resource pool, the subslot pattern indicating a quantity of subslots within the slot and a length of each subslot of the quantity of subslots;
identifying, by the network entity, one or more subslots from the subslot pattern for the set of contiguous subslots that are available for sidelink communications; and
transmitting, by the network entity to a UE of the group of UEs, an indication that the one or more subslots are reserved for a sidelink transmission by the UE associated with the sidelink communications.

24. The method of claim 23, wherein transmitting the indication that the one or more subslots are reserved for the sidelink communications comprises:
transmitting downlink control information to the UE, wherein the downlink control information reserves the one or more subslots for transmission of a sidelink message from the UE to a second UE of the group of UEs.

25. The method of claim 23, wherein the indication that the one or more subslots are reserved for the sidelink communications allocates sidelink resources within the sidelink resource pool to the UE for sidelink transmissions by the UE, the allocated sidelink resources comprising the one or more subslots and at least one subslot within a second slot of the sidelink resource pool.

26. The method of claim 23, further comprising:
selecting a resource reservation mode for a sidelink communication by the UE, wherein the selected resource reservation mode is one of a set of resource reservation modes comprising:
a first resource reservation mode that corresponds to reserving, from the set of contiguous subslots, a single subslot per transport block; and
a second resource reservation mode that corresponds to reserving, from the set of contiguous subslots, a group of subslots per transport block; and
indicating the selected resource reservation mode to the UE via the first indication of the configuration of the sidelink resource pool or via downlink control information.

27. An apparatus for wireless communications by a first user equipment (UE), comprising:
a processor;
memory coupled with the processor; and
instructions stored in the memory and executable by the processor to cause the apparatus to:
receive, by the first UE, a first indication of a configuration of a sidelink resource pool for a group of UEs that includes the first UE, wherein the sidelink resource pool comprises one or more slots in a time domain and one or more subchannels in a frequency domain, and wherein a slot of the sidelink resource pool comprises a control region allocated for a sidelink control channel and a set of contiguous subslots each allocated for a sidelink data channel;
receive, by the first UE, a second indication for the sidelink resource pool of a subslot pattern for the slot of the sidelink resource pool, the subslot pattern indicating a quantity of subslots within the slot and a length of each subslot of the quantity of subslots;
transmit, by the first UE to a second UE of the group of UEs in the control region of the slot, sidelink control information that reserves a subslot from the subslot pattern for the slot for a transmission of a sidelink message to the second UE; and
transmit, by the first UE, at least a portion of the sidelink message to the second UE in the subslot.

28. The apparatus of claim 27, wherein the instructions are further executable by the processor to cause the apparatus to:
reserve, via the sidelink control information, a second subslot for a retransmission of the sidelink message, wherein the second subslot is within the slot or within a second set of contiguous subslots included in a second slot of the sidelink resource pool; and
transmit the retransmission of the sidelink message to the second UE in the second subslot.

29. The apparatus of claim 28, wherein the instructions are further executable by the processor to cause the apparatus to:

receive, from the second UE in a third subslot subsequent to the subslot and prior to the second subslot, a sidelink feedback message corresponding to the sidelink message, wherein transmitting the retransmission of the sidelink message in the second subslot is based at least in part on receiving the sidelink feedback message.

30. The apparatus of claim 27, wherein:

the sidelink control information reserves a group of subslots within the set of contiguous subslots, the group of subslots comprising the subslot and one or more other subslots; and the sidelink message comprises a transport block that spans the group of subslots.

\* \* \* \* \*